United States Patent
Zhang et al.

(10) Patent No.: US 11,743,021 B2
(45) Date of Patent: Aug. 29, 2023

(54) INTERFERENCE MEASUREMENTS FOR FULL DUPLEX TRANSMISSIONS

(71) Applicant: QUALCOMM Incorporated, San Diego, CA (US)

(72) Inventors: Qian Zhang, Basking Ridge, NJ (US); Yan Zhou, San Diego, CA (US); Juan Montojo, San Diego, CA (US); Tao Luo, San Diego, CA (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 17/302,205

(22) Filed: Apr. 27, 2021

(65) Prior Publication Data
US 2021/0351902 A1    Nov. 11, 2021

Related U.S. Application Data

(60) Provisional application No. 63/022,318, filed on May 8, 2020, provisional application No. 63/022,306, filed on May 8, 2020.

(51) Int. Cl.
*H04L 5/14* (2006.01)
*H04W 24/10* (2009.01)
(Continued)

(52) U.S. Cl.
CPC ......... *H04L 5/1461* (2013.01); *H04B 17/318* (2015.01); *H04B 17/336* (2015.01); *H04L 5/0051* (2013.01); *H04W 24/10* (2013.01)

(58) Field of Classification Search
CPC .................................................. H04W 24/10
See application file for complete search history.

(56) References Cited

U.S. PATENT DOCUMENTS

2007/0298807 A1\* 12/2007 Yarkosky ............... H04W 16/12
  455/450
2015/0229461 A1\* 8/2015 DiFazio .................... H04L 5/14
  370/280

(Continued)

FOREIGN PATENT DOCUMENTS

WO    WO-2020034312 A1    2/2020

OTHER PUBLICATIONS

Huawei, et al., "Enhancements on Multi-Beam Operation", 3GPP Draft, 3GPP TSG RAN WG1 Meeting #98bis, R1-1910074, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), XP051808412, 18 Pages, Retrieved from the Internet: URL: https://ftp.3gpp.org/tsg_ran/WG1_RL1/TSGR1_98b/Docs/R1-1910074.zip R1-1910074.docx [retrieved on Oct. 5, 2019] Section "3.3 Mapping/Association Between CMR and NZP IMR", Observation 3, Options 2C, 3, Proposals 9 and 10, Section "3.4 Reporting of IMR-Related Information", pp. 1-4 , pp. 10-12.

(Continued)

Primary Examiner — Zhiren Qin
(74) Attorney, Agent, or Firm — Harrity & Harrity, LLP

(57) ABSTRACT

Various aspects of the present disclosure generally relate to wireless communication. In some aspects, a user equipment (UE) may receive a configuration for a channel measurement (CM) process indicating at least one channel measurement resource (CMR) associated with quasi co-location (QCL) information, wherein the QCL information corresponds to a transmit (Tx) beam of the base station associated with a receive (Rx) beam of the UE; receive a configuration for an interference measurement (IM) process indicating at least one interference measurement resource (IMR) associated with a UE beam pair comprising the Rx beam of the UE (Continued)

and a Tx beam of the UE; perform a self-interference measurement (SIM), wherein the SIM procedure is based at least in part on the CM process and the IM process; and transmit, to the base station, a measurement report based at least in part on the SIM procedure. Numerous other aspects are provided.

23 Claims, 14 Drawing Sheets

(51) Int. Cl.
*H04L 5/00* (2006.01)
*H04B 17/318* (2015.01)
*H04B 17/336* (2015.01)

(56) References Cited

U.S. PATENT DOCUMENTS

| | | | |
|---|---|---|---|
| 2017/0202006 A1* | 7/2017 | Rao | H04W 72/542 |
| 2018/0152957 A1 | 5/2018 | Zhang et al. | |
| 2019/0260485 A1* | 8/2019 | Byun | H04B 17/336 |
| 2021/0153214 A1* | 5/2021 | Zhang | H04B 1/525 |
| 2021/0400677 A1* | 12/2021 | Lee | H04L 5/005 |

OTHER PUBLICATIONS

International Search Report and Written Opinion—PCT/US2021/070479—ISA/EPO—dated Oct. 4, 2021.
Partial International Search Report—PCT/US2021/070479—ISA/EPO—dated Aug. 13, 2021.

* cited by examiner

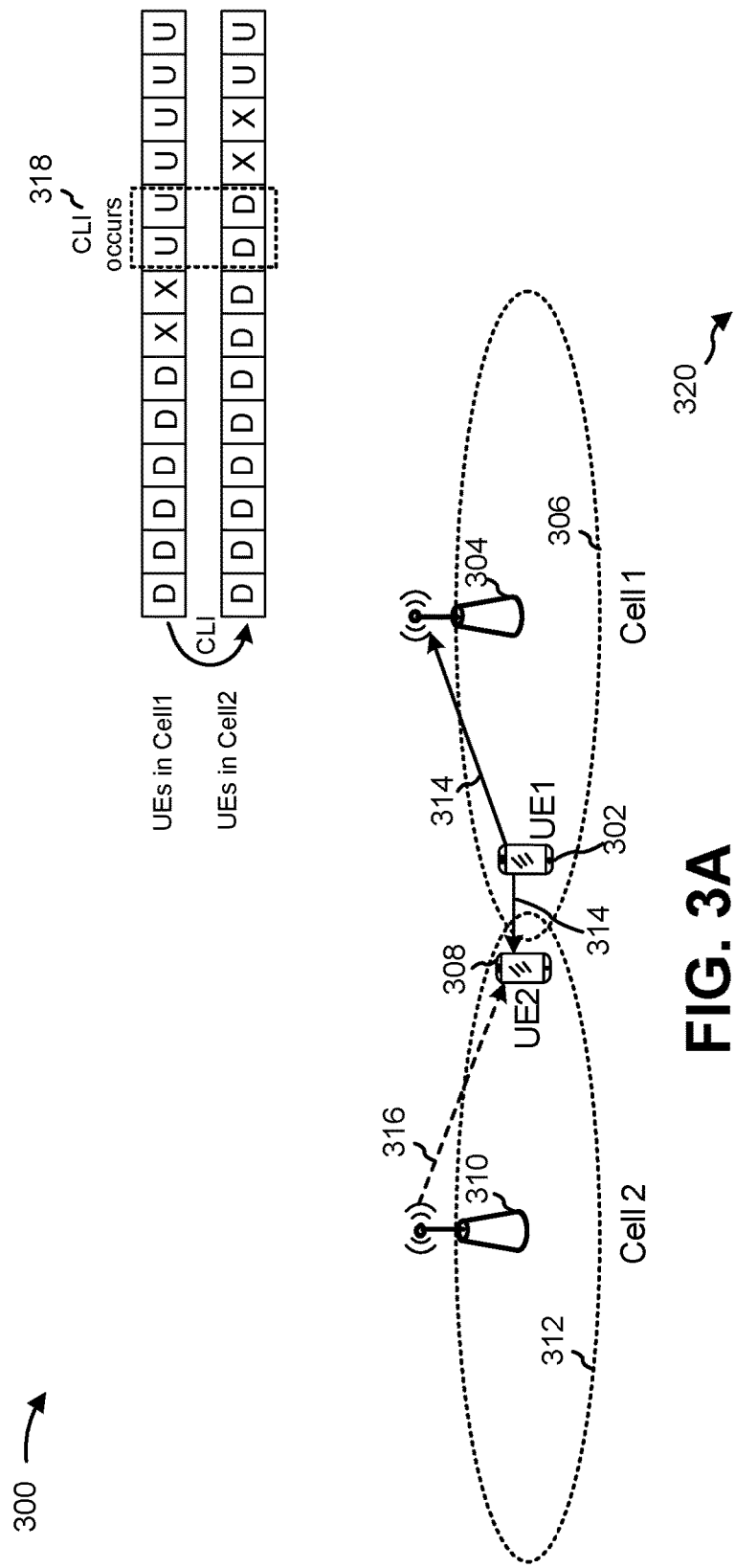
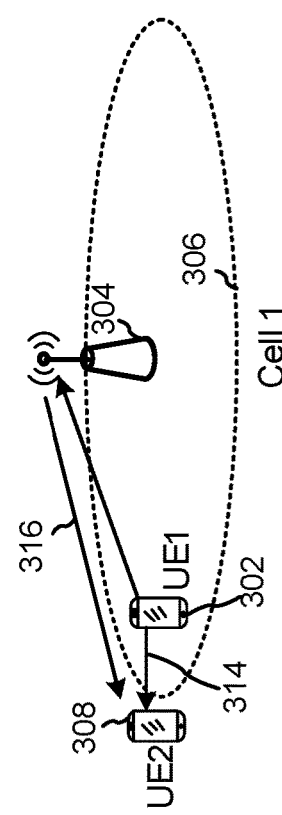
FIG. 3A
FIG. 3B

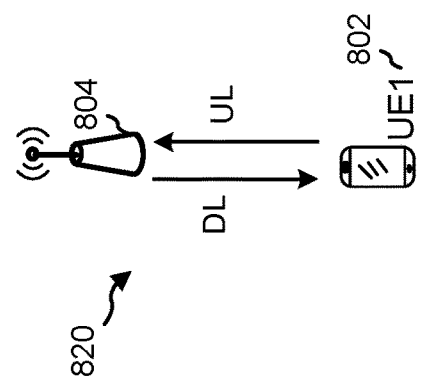
FIG. 8B
FIG. 8C
FIG. 8A

INTERFERENCE MEASUREMENTS FOR FULL DUPLEX TRANSMISSIONS

CROSS-REFERENCE TO RELATED APPLICATION

This patent application claims priority to U.S. Provisional Patent Application No. 63/022,306, filed on May 8, 2020, entitled "QUASI CO-LOCATION RELATION BETWEEN A CHANNEL MEASUREMENT RESOURCE AND AN INTERFERENCE MEASUREMENT RESOURCE FOR FULL DUPLEX TRANSMISSIONS," and to U.S. Provisional Patent Application No. 63/022,318, filed on May 8, 2020, entitled "OVERLAPPED BANDWIDTH AND GUARD BANDWIDTH MEASUREMENT FOR FULL DUPLEX TRANSMISSIONS," each of which is assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for interference measurements for full duplex transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

Full-duplex (FD) communication refers to contemporaneous uplink and downlink communication by a single device using the same resources. FD communication may provide a reduction in latency, enhance spectral efficiency per cell or per UE, and allow for a more efficient utilization of resources.

SUMMARY

In some aspects, a method of wireless communication, performed by a user equipment, may include receiving, from a base station, a channel measurement (CM) configuration for a CM process indicating at least one channel measurement resource (CMR) associated with quasi co-location (QCL) information, wherein the QCL information corresponds to a transmit (Tx) beam of the base station associated with a receive (Rx) beam of the UE; receiving an interference measurement (IM) configuration for an IM process indicating at least one interference measurement resource (IMR) associated with a UE beam pair comprising the Rx beam of the UE and a Tx beam of the UE; performing, in a full duplex communication mode, a self-interference measurement (SIM) procedure to determine one or more SIM metrics associated with the UE beam pair, wherein the SIM procedure is based at least in part on the CM process and the IM process; and transmitting, to the base station, a measurement report based at least in part on the SIM procedure.

In some aspects, a method of wireless communication, performed by a base station, may include transmitting, to a UE, a CM configuration for a CM process indicating at least one CMR associated with QCL information, wherein the QCL information corresponds to a Tx beam of the base station associated with an Rx beam of the UE; transmitting an IM configuration for an IM process indicating at least one IMR associated with a UE beam pair comprising the Rx beam of the UE and a Tx beam of the UE; receiving, from the UE, a measurement report based at least in part on a SIM procedure, wherein the measurement report indicates one or more SIM metrics associated with the UE beam pair, wherein the SIM procedure is based at least in part on the CM process and the IM process.

In some aspects, a user equipment for wireless communication may include a memory and one or more processors coupled to the memory. The one or more processors may be configured to receive, from a base station, a CM configuration for a CM process indicating at least one CMR associated with QCL information, wherein the QCL information corresponds to a Tx beam of the base station associated with an Rx beam of the UE; receive an IM configuration for an IM process indicating at least one IMR associated with a UE beam pair comprising the Rx beam of the UE and a Tx beam of the UE; perform, in a full duplex communication mode, a SIM procedure to determine one or more SIM metrics associated with the UE beam pair, wherein the SIM procedure is based at least in part on the CM process and the IM process; and transmit, to the base station, a measurement report based at least in part on the SIM procedure.

In some aspects, a base station for wireless communication may include a memory and one or more processors coupled to the memory. The one or more processors may be configured to transmit, to a UE, a CM configuration for a CM process indicating at least one CMR associated with QCL information, wherein the QCL information corresponds to a Tx beam of the base station associated with an Rx beam of the UE; transmit IM configuration for an IM process indicating at least one IMR associated with a UE beam pair comprising the Rx beam of the UE and a Tx beam of the UE; receive, from the UE, a measurement report based at least in part on a SIM procedure, wherein the measurement report indicates one or more SIM metrics associated with the UE beam pair, wherein the SIM procedure is based at least in part on the CM process and the IM process.

In some aspects, a non-transitory computer-readable medium may store one or more instructions for wireless communication. The one or more instructions, when executed by one or more processors of a UE, may cause the one or more processors to receive, from a base station, a CM configuration for a CM process indicating at least one CMR associated with QCL information, wherein the QCL information corresponds to a Tx beam of the base station associated with an Rx beam of the UE; receive an IM configuration for an IM process indicating at least one IMR associated with a UE beam pair comprising the Rx beam of the UE and a Tx beam of the UE; perform, in a full duplex communication mode, a SIM procedure to determine one or more SIM metrics associated with the UE beam pair, wherein the SIM procedure is based at least in part on the CM process and the IM process; and transmit, to the base station, a measurement report based at least in part on the SIM procedure.

In some aspects, a non-transitory computer-readable medium may store one or more instructions for wireless communication. The one or more instructions, when executed by one or more processors of a base station, may cause the one or more processors to transmit, to a UE, a CM configuration for a CM process indicating at least one CMR associated with QCL information, wherein the QCL information corresponds to a Tx beam of the base station associated with an Rx beam of the UE; transmit an IM configuration for an IM process indicating at least one IMR associated with a UE beam pair comprising the Rx beam of the UE and a Tx beam of the UE; receive, from the UE, a measurement report based at least in part on a SIM procedure, wherein the measurement report indicates one or more SIM metrics associated with the UE beam pair, wherein the SIM procedure is based at least in part on the CM process and the IM process.

In some aspects, an apparatus for wireless communication may include means for receiving, from a base station, a CM configuration for a CM process indicating at least one CMR associated with QCL information, wherein the QCL information corresponds to a Tx beam of the base station associated with an Rx beam of the apparatus; means for receiving an IM configuration for an IM process indicating at least one IMR associated with a UE beam pair comprising the Rx beam of the UE and a Tx beam of the apparatus; means for performing, in a full duplex communication mode, a SIM procedure to determine one or more SIM metrics associated with the UE beam pair, wherein the SIM procedure is based at least in part on the CM process and the IM process; and means for transmitting, to the base station, a measurement report based at least in part on the SIM procedure.

In some aspects, an apparatus for wireless communication may include means for transmitting, to a UE, a CM configuration for a CM process indicating at least one CMR associated with QCL information, wherein the QCL information corresponds to a Tx beam of the apparatus associated with an Rx beam of the UE; means for transmitting an IM configuration for an IM process indicating at least one IMR associated with a UE beam pair comprising the Rx beam of the UE and a Tx beam of the UE; means for receiving, from the UE, a measurement report based at least in part on a SIM procedure, wherein the measurement report indicates one or more SIM metrics associated with the UE beam pair, wherein the SIM procedure is based at least in part on the CM process and the IM process.

In some aspects, a method of wireless communication, performed by a UE, may include performing, in a full duplex communication mode, an SIM procedure associated with an Rx beam and a Tx beam of the UE, wherein the SIM procedure is performed using an uplink (UL) frequency resource associated with a corresponding downlink (DL) frequency resource, wherein the SIM procedure corresponds to at least one of: a frequency overlap metric that indicates: an overlap between the DL frequency resource and the UL frequency resource, or a guard bandwidth between the DL frequency resource and the UL frequency resource, a time alignment between the DL frequency resource and the UL frequency resource, or a combination thereof; and transmitting, to a base station, a measurement report based at least in part on the SIM procedure.

In some aspects, a method of wireless communication, performed by a base station, may include transmitting, to a UE, in a full duplex communication mode, a configuration of a SIM procedure associated with an Rx beam and a Tx beam of the UE, wherein the SIM procedure is associated with a UL frequency resource associated with a corresponding DL frequency resource, wherein the SIM procedure corresponds to at least one of: a frequency overlap metric that indicates: an overlap between the DL frequency resource and the UL frequency resource, or a guard bandwidth between the DL frequency resource and the UL frequency resource, a time alignment between the DL frequency resource and the UL frequency resource, or a combination thereof; and receiving, from the UE, a measurement report based at least in part on the SIM procedure.

In some aspects, a UE for wireless communication may include a memory and one or more processors coupled to the memory. The one or more processors may be configured to perform, in a full duplex communication mode, a SIM procedure associated with an Rx beam and a Tx beam of the UE, wherein the SIM procedure is performed using a UL frequency resource associated with a corresponding DL frequency resource, wherein the SIM procedure corresponds to at least one of: a frequency overlap metric that indicates: an overlap between the DL frequency resource and the UL frequency resource, or a guard bandwidth between the DL frequency resource and the UL frequency resource, a time alignment between the DL frequency resource and the UL frequency resource, or a combination thereof; and transmit, to a base station, a measurement report based at least in part on the SIM procedure.

In some aspects, a base station for wireless communication may include a memory and one or more processors coupled to the memory. The one or more processors may be configured to transmit, to a UE, in a full duplex communication mode, a configuration of a SIM procedure associated with an Rx beam and a Tx beam of the UE, wherein the SIM procedure is associated with a UL frequency resource associated with a corresponding DL frequency resource, wherein the SIM procedure corresponds to at least one of: a frequency overlap metric that indicates: an overlap between the DL frequency resource and the UL frequency resource, or a guard bandwidth between the DL frequency resource and the UL frequency resource, a time alignment between the DL frequency resource and the UL frequency resource, or a combination thereof; and receive, from the UE, a measurement report based at least in part on the SIM procedure.

In some aspects, a non-transitory computer-readable medium may store one or more instructions for wireless communication. The one or more instructions, when executed by one or more processors of a UE, may cause the one or more processors to perform, in a full duplex communication mode, a SIM procedure associated with an Rx beam and a Tx beam of the UE, wherein the SIM procedure is performed using a UL frequency resource associated with a corresponding DL frequency resource, wherein the SIM procedure corresponds to at least one of: a frequency overlap metric that indicates: an overlap between the DL frequency resource and the UL frequency resource, or a guard bandwidth between the DL frequency resource and the UL frequency resource, a time alignment between the DL frequency resource and the UL frequency resource, or a combination thereof; and transmit, to a base station, a measurement report based at least in part on the SIM procedure.

In some aspects, a non-transitory computer-readable medium may store one or more instructions for wireless communication. The one or more instructions, when executed by one or more processors of a base station, may cause the one or more processors to transmit, to a UE, in a full duplex communication mode, a configuration of a SIM procedure associated with an Rx beam and a Tx beam of the UE, wherein the SIM procedure is associated with a UL frequency resource associated with a corresponding DL frequency resource, wherein the SIM procedure corresponds to at least one of: a frequency overlap metric that indicates: an overlap between the DL frequency resource and the UL frequency resource, or a guard bandwidth between the DL frequency resource and the UL frequency resource, a time alignment between the DL frequency resource and the UL frequency resource, or a combination thereof; and receive, from the UE, a measurement report based at least in part on the SIM procedure.

In some aspects, an apparatus for wireless communication may include means for performing, in a full duplex communication mode, a SIM procedure associated with an Rx beam and a Tx beam of the apparatus, wherein the SIM procedure is performed using a UL frequency resource associated with a corresponding DL frequency resource, wherein the SIM procedure corresponds to at least one of: a frequency overlap metric that indicates: an overlap between the DL frequency resource and the UL frequency resource, or a guard bandwidth between the DL frequency resource and the UL frequency resource, a time alignment between the DL frequency resource and the UL frequency resource, or a combination thereof; and means for transmitting, to a base station, a measurement report based at least in part on the SIM procedure.

In some aspects, an apparatus for wireless communication may include means for transmitting, to a UE, in a full duplex communication mode, a configuration of a SIM procedure associated with an Rx beam and a Tx beam of the UE, wherein the SIM procedure is associated with a UL frequency resource associated with a corresponding DL frequency resource, wherein the SIM procedure corresponds to at least one of: a frequency overlap metric that indicates: an overlap between the DL frequency resource and the UL frequency resource, or a guard bandwidth between the DL frequency resource and the UL frequency resource, a time alignment between the DL frequency resource and the UL frequency resource, or a combination thereof; and means for receiving, from the UE, a measurement report based at least in part on the SIM procedure.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3A is a diagram illustrating a wireless network operating in a semi-static time division duplex (TDD) configuration, in accordance with the present disclosure.

FIG. 3B is a diagram illustrating a wireless network operating in a dynamic TDD configuration, in accordance with the present disclosure.

FIGS. 8A-8C are diagrams illustrating examples of full duplex communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
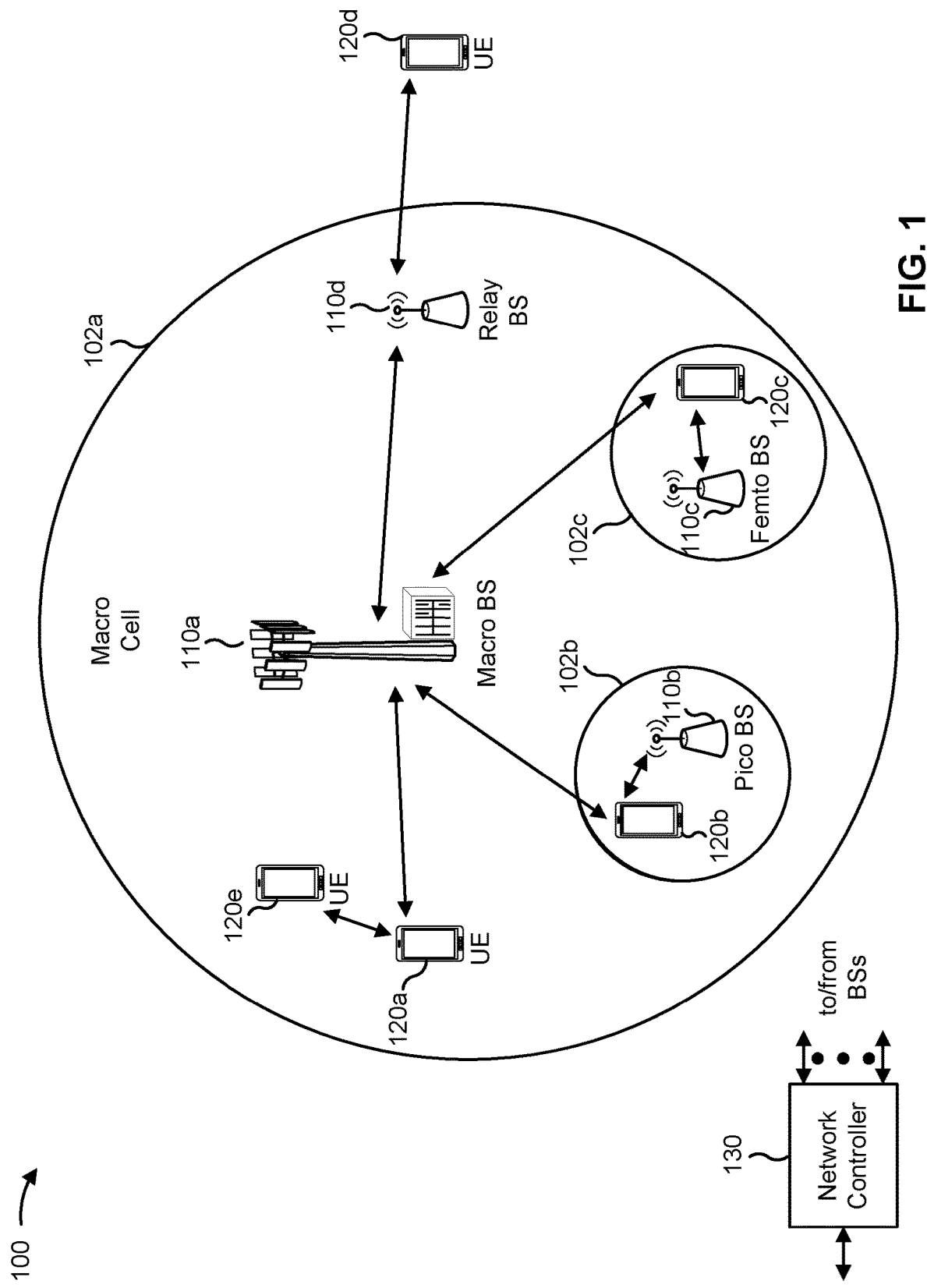
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
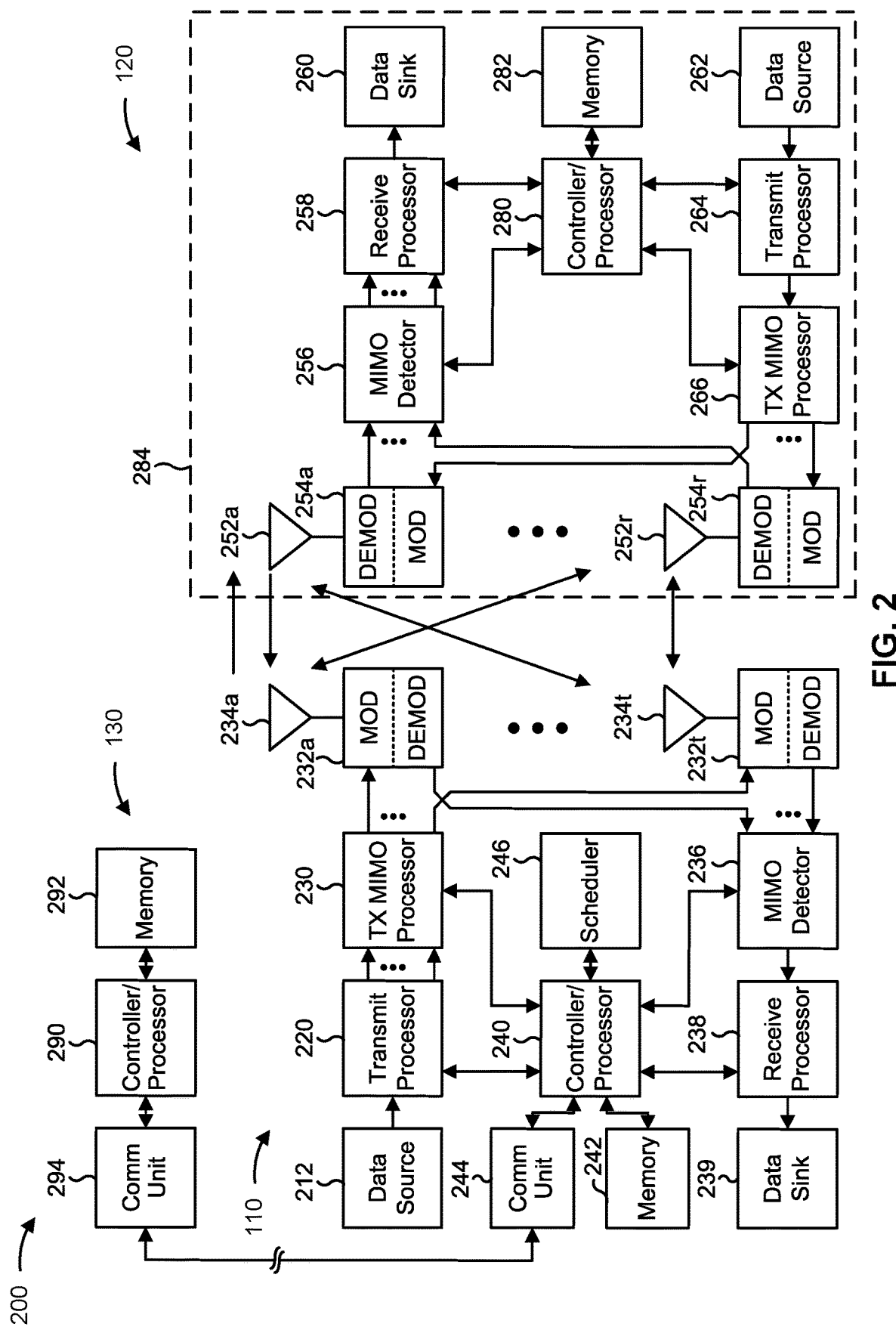
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (Tx) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 9-14).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 9-14).

Controller/processor 240 of base station 110, controller/processor 280 of UE 120, and/or any other component(s) of FIG. 2 may perform one or more techniques associated with full duplex self-interference measurement, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, process 1300 of FIG. 13, process 1400 of FIG. 14, and/or other processes as described herein. In some aspects, executing instructions may include running the instructions, converting the instructions, compiling the instructions, and/or interpreting the instructions, among other examples.

In some aspects, UE 120 may include means for receiving, from a base station, a channel measurement (CM) configuration for a CM process indicating at least one channel measurement resource (CMR) associated with quasi co-location (QCL) information, wherein the QCL information corresponds to a Tx beam of the base station associated with a receive (Rx) beam of the UE, means for receiving an interference measurement (IM) configuration for an IM process indicating at least one interference measurement resource (IMR) associated with a UE beam pair comprising the Rx beam of the UE and a Tx beam of the UE, means for performing, in a full duplex communication mode, a self-interference measurement (SIM) procedure to determine one or more SIM metrics associated with the UE beam pair, wherein the SIM procedure is based at least in part on the CM process and the IM process, means for transmitting, to the base station, a measurement report based at least in part on the SIM procedure, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, a CM configuration for a CM process indicating at least one CMR associated with QCL information, wherein the QCL information corresponds to a Tx beam of the base station associated with an Rx beam of the UE, means for transmitting an IM configuration for an IM process indicating at least one IMR associated with a UE beam pair comprising the Rx beam of the UE and a Tx beam of the UE, means for receiving, from the UE, a measurement report based at least in part on an SIM procedure, wherein the measurement report indicates one or more SIM metrics associated with the UE beam pair, wherein the SIM procedure is based at least in part on the CM process and the IM process, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, UE 120 may include means for performing, in a full duplex communication mode, a SIM procedure associated with an Rx beam and a Tx beam of the UE, wherein the SIM procedure is performed using a UL frequency resource associated with a corresponding DL frequency resource, wherein the SIM procedure corresponds to at least one of: a frequency overlap metric that indicates: an overlap between the DL frequency resource and the UL frequency resource, or a guard bandwidth between the DL frequency resource and the UL frequency resource, a time alignment between the DL frequency resource and the UL frequency resource, or a combination thereof, means for transmitting, to a base station, a measurement report based at least in part on the SIM procedure, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, in a full duplex communication mode, a configuration of a SIM procedure associated with an Rx beam and a Tx beam of the UE, wherein the SIM procedure is associated with a UL frequency resource associated with a corresponding DL frequency resource, wherein the SIM procedure corresponds to at least one of: a frequency overlap metric that indicates: an overlap between the DL frequency resource and the UL frequency resource, or a guard bandwidth between the DL frequency resource and the UL frequency resource, a time alignment between the DL frequency resource and the UL frequency resource, or a combination thereof, means for receiving, from the UE, a measurement report based at least in part on the SIM procedure, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIG. 3A is a diagram illustrating a wireless network 300 operating in a semi-static time division duplex (TDD) configuration in accordance with the present disclosure. FIG. 3B is a diagram illustrating a wireless network 320 operating in dynamic TDD configuration in accordance with the present disclosure. Dynamic TDD may enhance spectrum efficiency of wireless communication networks and provide a higher throughput by dynamically altering UL or DL transmission direction. However, if nearby UEs have different TDD UL-DL slot formats, one UE (e.g., UE2 308) may be a victim and may receive an UL transmission from another UE (e.g., UE1 302) known as an aggressor. The received UL transmission from the UE1 302 is known as cross link interference (CLI). CLI occurs when a UL symbol (e.g., an interfering symbol) of an aggressor collides with a DL symbol (e.g., an interfered symbol) of a victim. CLI may be caused by a UL transmission from the aggressor UE (e.g., UE1 302). The configuration of dynamic TDD is able to change dynamically in response to a change of traffic pattern. For example, in instances where the traffic pattern is UL heavy, dynamic TDD may recognize the change in the traffic pattern and adapt by providing more UL symbols to meet the demand. Alternatively, in instances where the traffic pattern is DL heavy, dynamic TDD may provide more DL symbols to meet the demand.

In FIG. 3A, UE1 302 is within Cell1 306 and is being served by base station 304, while UE2 308 is within Cell2 312 and is being served by base station 310. CLI may occur between UEs at the cell edges of nearby cells, as UEs at cell edges of nearby cells may be in close proximity to each other. As shown in FIG. 3A, UE1 302 and UE2 308 are at their respective cell edges and may be communicating with their respective base stations. UE1 302 may send a UL transmission 314 to base station 304, while UE2 308 is receiving a DL transmission 316 from base station 310. However, in certain instances, the UL transmission 314 sent by UE1 302 to base station 304 may also be received by UE2 308 while receiving the DL transmission 316 from base station 310. The UL transmission 314 from UE1 302 received by UE2 308 causes UL transmission 314 and may interfere with the DL transmission 316 UE2 308 from base station 310. As such, one or more UL symbols of the UL transmission 314 may collide with one or more DL symbols of the DL transmission 316. In the example of FIG. 3A, two UL symbols of the UL transmission 314 overlap or collide with two DL symbols of the DL transmission 316, such that CLI occurs at the overlap 318.

In the example of FIG. 3B, both UE1 302 and UE2 308 are being served by the same cell (e.g., cell1 306). Both UE 1 302 and UE2 308 are near the cell edge, and in some instances, the UL transmission 314 sent by UE1 302 to base station 304 may also be received by UE2 308 while receiving the DL transmission 316 from base station 304. The UL transmission 314 from UE1 302 received by UE2 may cause UL transmission 314 and may interfere with the DL transmission 316 of UE2 308 from the base station 304. As a result, one or more UL symbols of the UL transmission 314 may collide with one or more DL symbols of the DL transmission 316.

CLI measurements metrics include sounding reference signals reference signal received power (SRS-RSRP) and CLI-received signal strength indicator (CLI-RSSI). SRS-RSRP may include the linear average of the power contributions of the SRS to be measured over the configured resource elements within the considered measurement frequency bandwidth in the time resources in the configured measurement occasions. CLI-RSSI may include the linear average of the total received power observed only in certain OFDM symbols of measurement time resource(s), in the measurement bandwidth, over the configured resource elements for measurement by the UE. For both SRS-RSRP and CLI-RSSI measurement reports, both events may be triggered, and periodic reporting is supported. Layer3 (L3) filtering may be applied, such that for CLI-RSSI measurements, the implementation of the UE may determine whether to reset filtering upon a bandwidth part (BWP) switch. A dedicated measurement gap may not be needed.

As indicated above, FIGS. 3A and 3B are provided as one or more examples. Other examples may differ from what is described with regard to FIGS. 3A and 3B.

Figure 4:
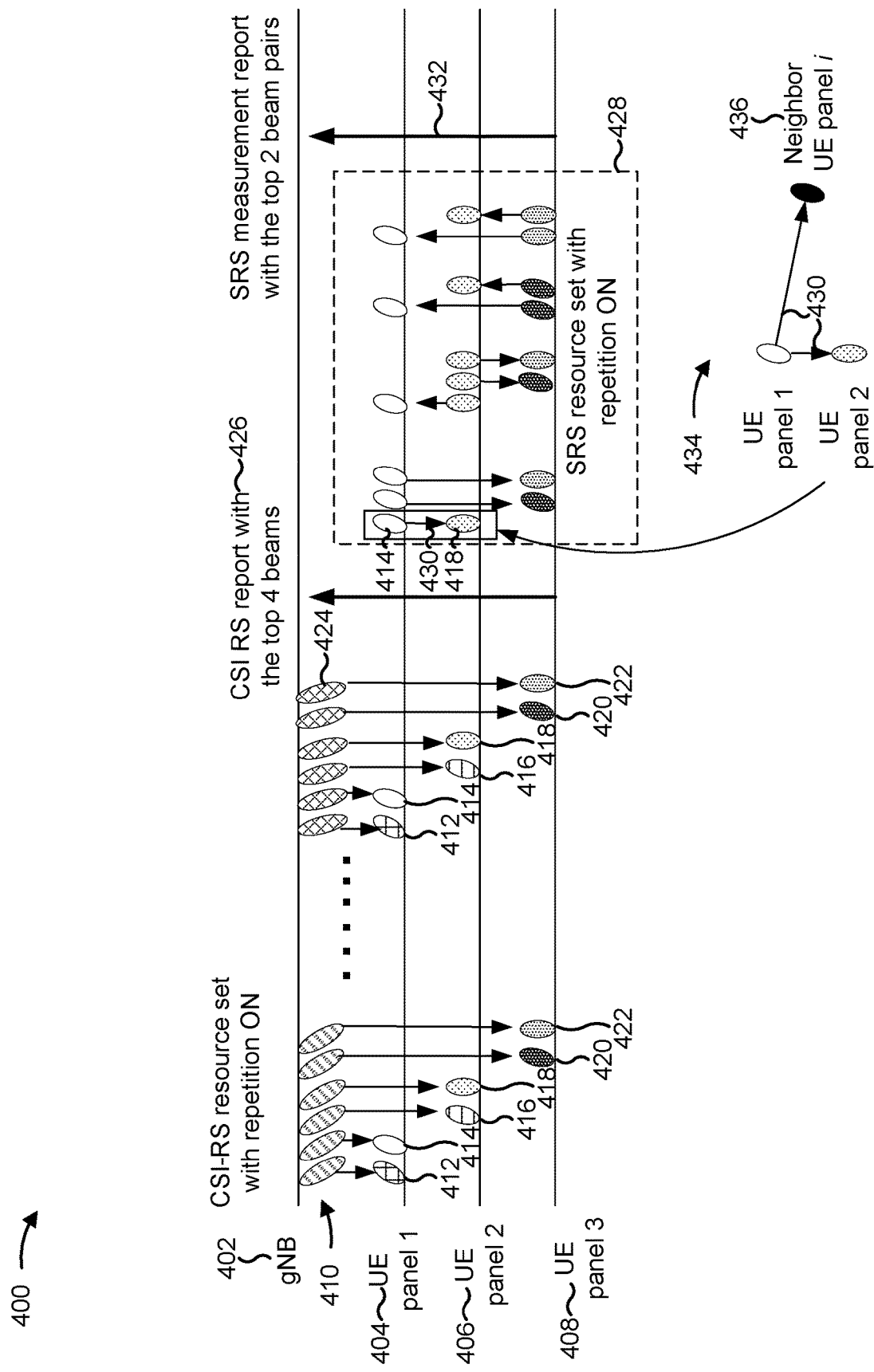
FIG. 4 is a diagram illustrating an example of self-interference measurement based at least in part on a channel state information reference signal measurement for beam management, in accordance with the present disclosure.

FIG. 4 is a diagram illustrating an example 400 of self-interference measurement based at least in part on a channel state information reference signal (CSI-RS) measurement for beam management in accordance with the present disclosure. Example 400 involves a base station 402 (shown as a gNB), and a UE comprising multiple UE panels (e.g., UE panels 1, 2, and 3, shown by reference numbers 404, 406, and 408, respectively). Generally, beams are represented by ovals in FIG. 4. An oval with a given fill represents a beam, and two or more ovals with the same fill, at different locations in FIG. 4, may represent the same receive beam or transmit beam at different times. For example, reference number 410 shows a set of CSI-RSs that are transmitted by the base station 402 on a first beam in a CSI-RS resource set with repetition. The UE may measure the CSI-RSs using respective receive beams 412, 414, 416, 418, 420, 422. Reference number 424 shows a set of CSI-RSs that are transmitted by the base station 402 on a second beam in a CSI-RS resource set with repetition. Again, the UE may measure the CSI-RSs using the respective receive beams 412, 414, 416, 418, 420, 422.

As shown by reference number 426, the UE may transmit a CSI-RS report to the base station 402. The CSI-RS report may indicate a top N beams, determined based at least in part on the measurements performed using the receive beams 412 through 422. In example 400, N is 4, though N may be some other number. The top N beams may be selected based at least in part on one or more metrics, described elsewhere herein. Here, the 4 CSI-RS beams associated with the 4 Rx beams 414, 418, 420, and 422, are selected (not shown).

Reference number 428 shows the determination of self-interference measurements by the UE 120 based at least in part on the selected beams. An arrow from a first beam to a second beam may indicate that the first beam transmits a reference signal that is measured using the second beam to determine a self-interference measurement. For example, the arrow shown by reference number 430 indicates the transmission of an SRS using the beam 414 that is measured using the beam 418 to determine a self-interference measurement for this Tx and Rx beam pair. The SRSs may be associated with an SRS resource set with repetition configured. In example 400, each pairing of transmit and receive beams from beams 414, 418, 420, and 422 are measured with the exception of the beam pairs formed by beams 420 and 422, since beams 420 and 422 are associated with the same panel. As shown by reference number 432, the UE may transmit an SRS measurement report indicating a top 2 beam pairs based at least in part on the self-interference measurements determined in connection with reference number 428.

As shown by reference number 434, in some aspects, a UE may determine a CLI measurement based at least in part on a reference signal associated with a self-interference measurement. For example, the same SRS transmission used to measure self-interference from beam 414 to beam 418 may be used by a neighbor UE to measure CLI at a panel i of the neighbor UE, as shown by reference number 436.

As indicated above, FIG. 4 is provided as an example. Other examples may differ from what is described with regard to FIG. 4.

Figure 5:
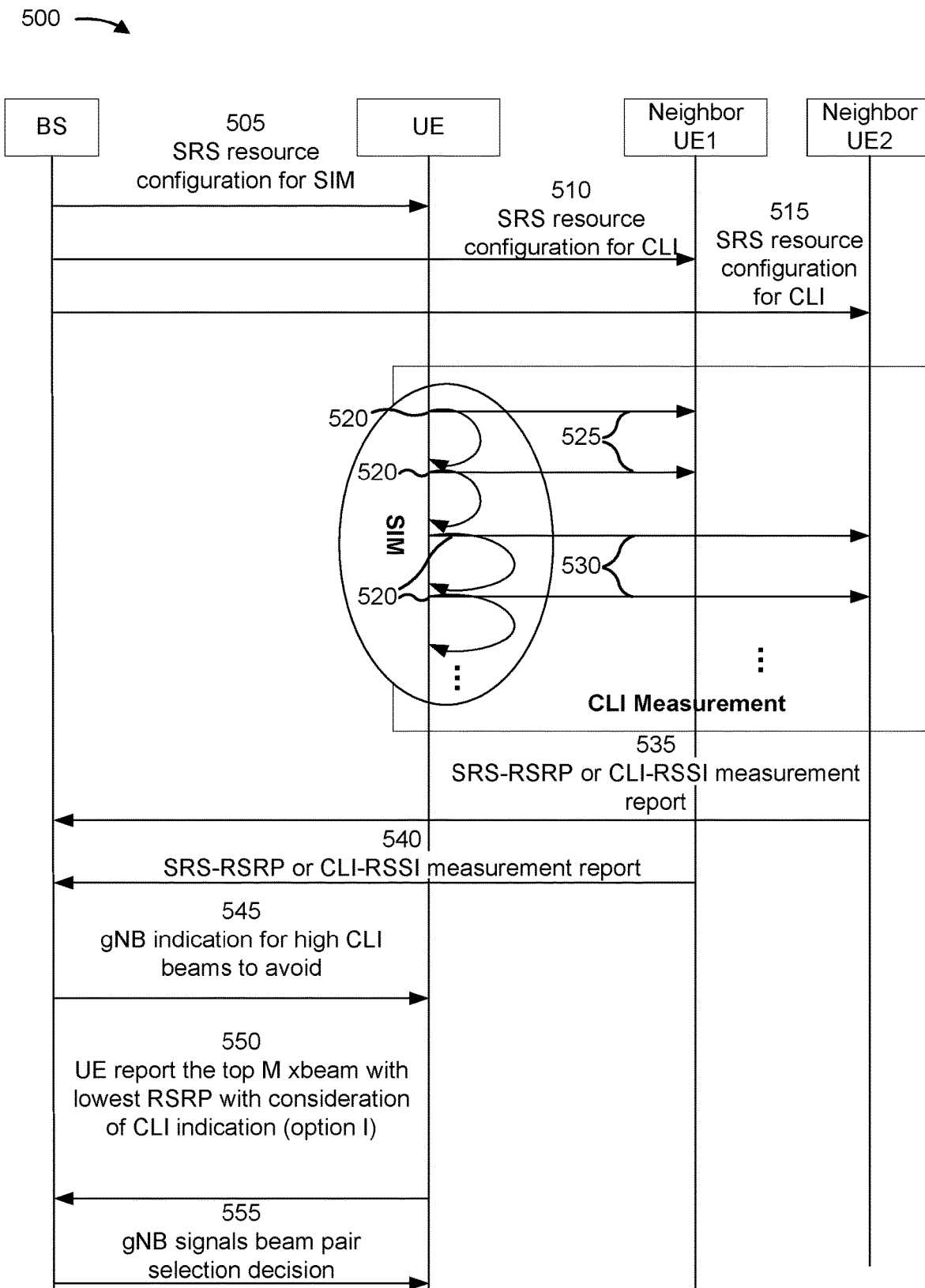
FIG. 5 is a diagram illustrating an example of signaling associated with self-interference measurement for a UE and cross-link interference measurement for one or more neighbor UEs, in accordance with the present disclosure.

FIG. 5 is a diagram illustrating an example 500 of signaling associated with self-interference measurement for a UE and cross-link interference measurement for one or more neighbor UEs in accordance with the present disclosure. As shown, example 500 includes a BS (e.g., BS 110), a UE (e.g., UE 120), and two neighbor UEs (e.g., UE 120), shown as Neighbor UE1 and Neighbor UE2.

As shown by reference number 505, the BS may provide, to the UE, a resource configuration for SIM. For example, the resource configuration may be an SRS resource configuration that indicates one or more SRSs to be transmitted by the UE 120. As shown by reference numbers 510 and 515, the BS may provide, to the neighbor UEs, resource configurations for CLI measurement. For example, the resource configurations for CLI measurement may be associated with or may share resources with the SRS resource configuration for the SRSs to be transmitted by the UE for SIM. As shown by reference number 520, the UE may transmit SRSs, and may perform SIM based at least in part on the SRSs. The curved arrows from the SRSs back to the UE indicate that the UE performs SIM based at least in part on the SRSs. As shown by reference number 525 and 530, the neighbor UEs may perform CLI measurements, in accordance with the SRS resource configuration, using the SRSs transmitted by the UE.

As shown by reference numbers 535 and 540, the neighbor UEs may transmit measurement reports based at least in part on the CLI measurements. For example, the measurement reports may include an SRS RSRP report, a CLI RSSI report, and/or the like. In some aspects, as shown by reference number 545, the BS may provide, to the UE, an indication of one or more beams, associated with high CLI measurements (e.g., CLI measurements that satisfy a threshold), that the UE is to avoid.

As shown by reference number 550, the UE may report a top M crossbeams (xbeams) (M is an integer) with a lowest RSRP of the beams measured by the UE. In some aspects, the top M crossbeams may be selected based at least in part on the CLI indication shown by reference number 545. As shown by reference number 555, the BS may transmit information indicating a beam pair selection decision. For example, the BS may select a UL/DL beam pair for the UE and may signal the selected UL/DL beam pair to the UE. In some aspects, the BS may select the UL/DL beam pair based at least in part on the CLI measurement feedback shown by reference numbers 535 and 540.

Figure 6:
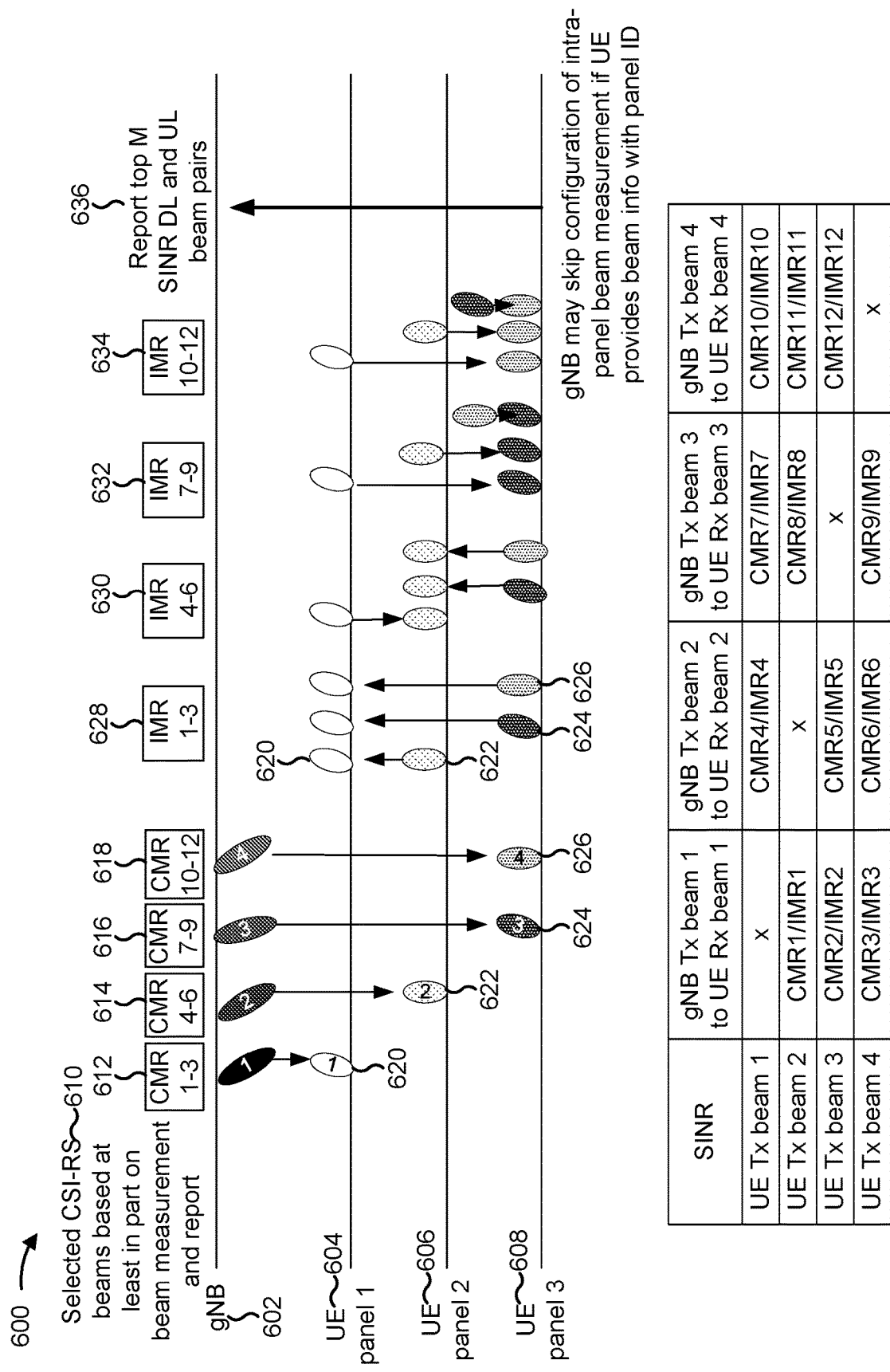
FIG. 6 is a diagram illustrating a beam measurement process, in accordance with the present disclosure.

FIG. 6 is a diagram 600 illustrating a beam measurement process in accordance with the present disclosure. The diagram 600 of FIG. 6 includes a base station 602, and a UE comprising multiple UE panels (e.g., UE panel1 604, UE panel2 606, UE panel3 608). The base station 602 and UE may be configured to select CSI-RS beams based at least in part on a beam measurement procedure (e.g., 610). The beam measurement procedure 610 may allow for the UE panels (e.g., 604, 606, 608) to measure CSI-RS signals from the base station 602 to determine which of the Rx beams are the best at the UE side, which may be based at least in part on the DL signal strength measured at the UE panels, and each Rx beam is associated with a Tx CSI-RS beam at the base station. The beam measurement procedure 610 may allow for the base station 602 to transmit multiple CSI-RS resources to the UE panels in order to measure the DL channel quality or signal strength at the UE side. The UE may send a CSI-RS report to the base station 602 indicating the top Tx beams at the base station with each of the top Tx beams associated with a top Rx beam at the UE side. The top Rx beams may be assumed to be the top Tx beams at the UE panels based at least in part on channel reciprocity. In some aspects, the UE may report the top four Tx beams. However, in some aspects, the UE may report more or less than the top four Tx beams. Upon the determination of the top four Tx beams with its associated top Rx beams at the UE, the UE may perform a SIM. The UE may also report the top four beams, each with an associated panel ID of the UE, so that the gNB can avoid configuring intra-panel SIM to save resource overhead.

To perform the SIM, the UE may transmit a transmission from the beam 620 from UE panel1 604, such that beams 622, 624, and 626 may measure the amount of energy they receive from the transmission of the beam 620. The transmission from the beam 620 may be an uplink transmission to the base station 602; however, during the uplink transmission from beam 620 to the base station 602, some energy may be received at the beams of the other panels. Such energy may be due to side lobes or based at least in part on the configuration of the other panels. As a result, the beams 622, 624, and 626 may measure the amount of self-interference that is caused by the transmission from the beam 620. This process repeats for all of the top four beams indicated in the CSI-RS report. For example, beam 622 may send a transmission such that beams 620, 624, and 626 measure the amount of self-interference caused by the transmission from beam 622. Upon the completion of the self-interference procedure and the channel measurement procedure, an indication 636 may be sent to the base station 602 indicating the top DL and UL beam pairs of the UE in a Layer 1 Signal to Interference plus Noise Ratio (L1-SINR) report via either the actual value or a largest value plus differential value of SINR. The DL and UL beams pairs selected as the top DL and UL beam pairs are beams that have passed a threshold for selection. In some aspects, the UE may report that no beams pass the threshold, such that no feasible beam and/or beam pair is present.

To perform the self-interference, a modified L1-SINR configuration and procedure may be utilized. L1-SINR may include two resource settings, the first resource setting (which may be provided by the higher layer parameter resourcesForChannelMeasurement) is configured to perform channel measurement (CM) via CSI-RS. The CM may measure the channel quality. The second resource (which may be provided by either higher layer parameter csi-IM-ResourcesForInterference or the higher layer parameter nzp-CSI-RS-ResourcesForinterference) is configured to perform IM via CSI-RS. The modified L1-SINR may be configured to utilize SRS, instead of CSI-RS, to perform the IM procedure for SIM purposes. Each CSI-RS resource for CMR may be associated with one SRS resource for IMR. The number of CSI-RS resources for CM may equal to the number of SRS resources for IM. The CMR may also be re-used for the original L1-SINR beam management purposes. In addition, the IMR may also be reused for CLI measurement purposes concurrently to measure the CLI at neighbor UEs using the same SRS resources used for SIM. In some aspects, the IMR configuration may be configured to define a full or reduced Tx power. For example, the reduced Tx power may be based at least in part on X dBm or X % of the full Tx power. The UE may use the configuration to scale up the calculated SINR accordingly.

In FIG. 6, the diagram 600 provides an example of the CM and IM using the modified L1-SINR configuration and procedure. The CM portion includes four CMRs 612, 614, 616, 618 such that the base station 602 is configured to transmit a CSI-RS to each of the top four Rx beams of the UE. For example, CMR 612 may be transmitted to Rx beam 620 of UE panel1 604, CMR 614 may be transmitted to Rx beam 622 of UE panel2 606, CMR 616 may be transmitted to Rx beam 624 of UE panel3 608, and CMR 618 may be transmitted to Rx beam 626 of UE panel3 608. The UE may measure the channel quality received at the UE by the corresponding Rx beams. The UE may store the channel quality measurements under the CMR to determine the SINR.

The IM portion includes the same amount of, or more, resources as in the CM portion, such that the CMRs are mapped to a corresponding IMR. For example, each CMR is associated with an IMR for the interference measurement. Each CMR can also be mapped to multiple IMRs for measuring the interference to the same Rx beam as the CMR but using transmissions from different beams of different panels of the UE. The IM portion includes four IMRs 628, 630, 632, 634 that are mapped to a corresponding CMRs. For example, CMR 612 may be mapped to IMR 628, CMR 614 may be mapped to IMR 630, CMR 616 may be mapped to IMR 632, and CMR 618 may be mapped to IMR 634. The IM portion allows for SIM to be performed. To perform SIM, the IMRs configure the UE with SRS resources. Each of the beams (e.g., 620, 622, 624, 626) may be configured to transmit an SRS. For example, the UE panels, when sending the uplink transmission for the SIM, may transmit an SRS. The transmitted SRS may be utilized to measure SIM. In some aspects, the UE panel1 604 may transmit the SRS at beam 620, such that beams 622, 624, and 626 may measure the amount of self-interference that is caused by the transmission from the beam 620. This process repeats for all the other beams 622, 624, 626. For example, beam 622 may send a transmission such that beams 620, 624, and 626 measure the amount of self-interference caused by the transmission from beam 622. Upon the completion of the CM and the SIM, a SINR may be determined.

The mapping of the CMRs and the IMRs allows for an SINR to be calculated based at least in part on the results of the CM and IM portions. The SINR may be determined based at least in part on a ratio of the CMR and the corresponding IMR, as shown in the table of FIG. 6.

The example of FIG. 6 provides an example of CM and IM resources being time division multiplexed (TDM), such that the CM portion and the IM portion occur at different times. In some aspects, a DL timing may be utilized for the CM, while a UL timing may be utilized for the IM. In such instances, the SINR may be calculated based at least in part on a ratio of CM and IM and noise (e.g., CM/(IM+noise)). Based upon the calculations of the SINR, the UE may report the SINR results to the base station 602. The SINR results may include a report of the top SINR DL and UL beam pairs.

As indicated above, FIG. 6 is provided as an example. Other examples may differ from what is provided with regard to FIG. 6.

Figure 7:
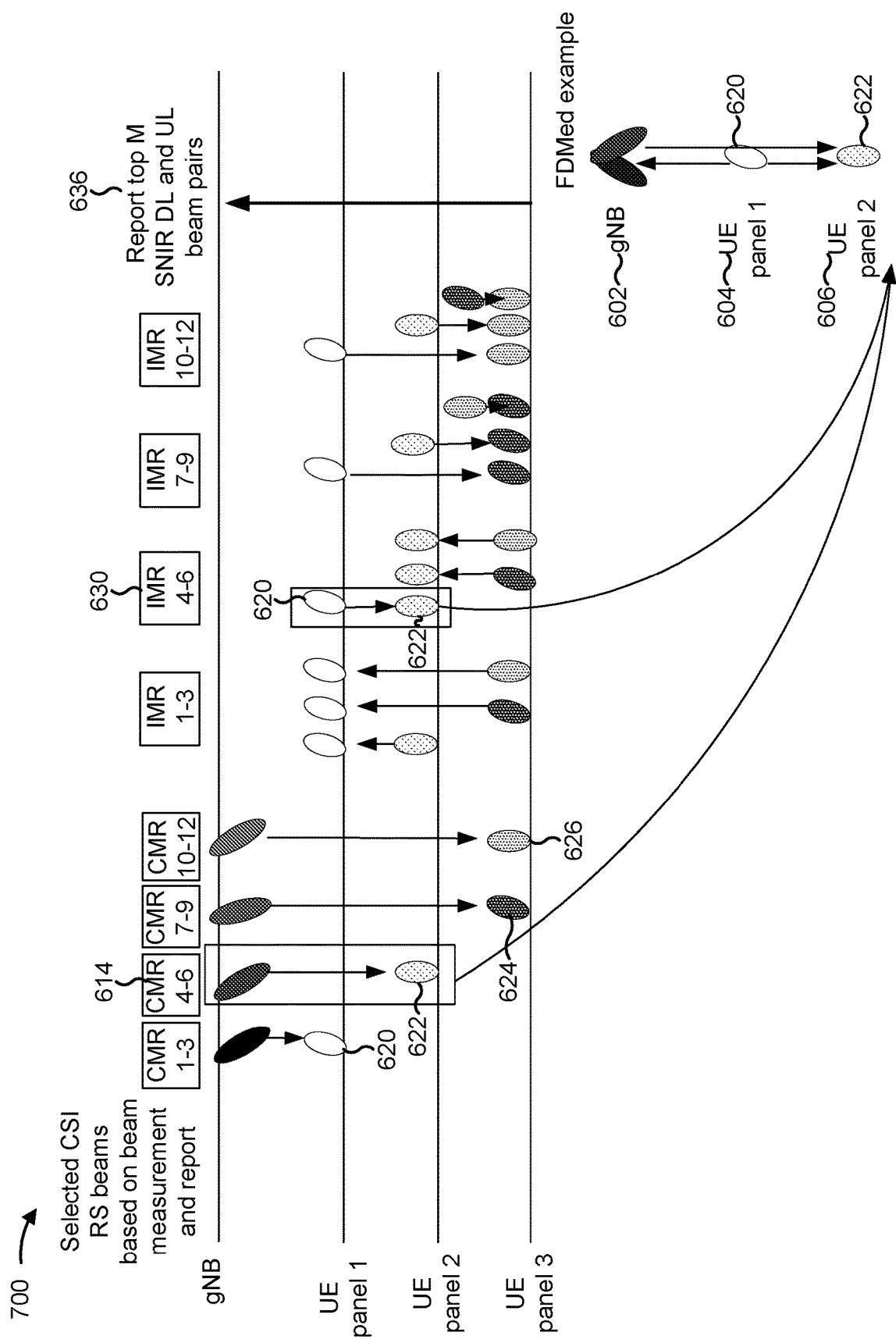
FIG. 7 is a diagram illustrating channel measurement and interference measurement using a modified layer one signal to interference plus noise ratio configuration and procedure, in accordance with the present disclosure.

FIG. 7 is a diagram 700 illustrating CM and IM using a modified L1-SINR configuration and procedure in accordance with the present disclosure. In the example of FIG. 7, the CM and IM resources are configured in a frequency division multiplexed (FDM) configuration, such that the CM and IM occur concurrently. For example, the CMR 614 and IMR 630 are shown in the FDM configuration. The base station 602 may transmit the CSI-RS to be received by beam 622 of UE panel2 606, while the beam 620 transmits the SRS that is received by beam 622 of UE panel2 606. The UE may measure the reception of the CSI-RS and the SRS in order to determine the SINR for the Rx beam 622. In some aspects, the CM and IM procedures under the FDM configuration may experience time misalignment for DL and/or UL reference signals (RSs). In some aspects, the UE may utilize DL timing or UL timing for both the CM and IM procedures concurrently happening in the FDM configuration. In aspects utilizing DL timing, the UE may calculate RSRP of the CSI-RS and may calculate a partial RSSI for the interference; then an estimated SINR is calculated based at least in part on the CM and IM procedures.

In some aspects, an SINR may not be determined if the Rx and Tx beam are on the same panel. For example, with reference to FIG. 6, an SINR may not be determined for an Rx beam 624 and a Tx beam of 626, because they are on the same panel. However, the base station may not be aware of the panel ID when configuring the SRS resources for the IMR. In such aspects, the base station may be configured to indicate whether the UE should still transmit the SRS in instances where the SRS beam and the SIM beam are on the same panel. In some aspects, the base station may be configured to indicate whether the UE should still transmit the SRS if the SRS is being reused for a CLI measurement at a neighbor UE.

In some aspects, the UE may be configured to indicate that one or more particular beam pairs may be an infeasible beam pair, such that the SRS beam and the SIM beam are on the same panel. In some aspects, the UE may be configured to indicate to the UE the existence of one or more infeasible beam pairs during the SIM configuration phase. In response to receiving the indication of infeasible beam pairs, the base station may update the SIM configuration and skip or prevent the configuring of intra-panel beam measurements, which may contribute to wasting resources. In some aspects, if the UE indicates the existence of infeasible beam pairs, then the reported value of such beam pairs may be reported as background interference, instead of a self-interference value. In some aspects, such as for SIM, the UE may be configured to indicate beams associated with panel IDs such that the base station may avoid or skip the configuring of intra-panel SIM, which may assist in reducing and/or saving resource overhead.

As indicated above, FIG. 7 is provided as an example. Other examples may differ from what is described with regard to FIG. 7.

FIGS. 8A-8C are diagrams illustrating examples 800, 810, 820 of full duplex (FD) communication in accordance with the present disclosure. The example 800 of FIG. 8A includes a UE1 802 and two base stations (e.g., TRPs) 804-1, 804-2, wherein the UE1 802 is sending UL transmissions to base station 804-1 and is receiving DL transmissions from base station 804-2. In the example 800 of FIG. 8A, FD is enabled for the UE1 802, but not for the base stations 804-1, 804-2. The example 810 of FIG. 8B includes two UEs, UE1 802-1 and UE2 802-2, and a base station 804, wherein the UE1 802-1 is receiving a DL transmission from the base station 804 and the UE2 802-2 is transmitting a UL transmission to the base station 804. In the example 810 of FIG. 8B, FD is enabled for the base station 804, but not for the UEs UE1 802-1 and UE2 802-2. The example 820 of FIG. 8C includes a UE1 802 and a base station 804, wherein the UE1 802 is receiving a DL transmission from the base station 804 and the UE1 802 is transmitting a UL transmission to the base station 804. In the example 820 of FIG. 8C, FD is enabled for both the UE1 802 and the base station 804.

As indicated above, FIGS. 8A-8C are provided as one or more examples. Other examples may differ from what is described with regard to FIGS. 8A-8C.

The present disclosure generally relates to improving the manner in which flexible TDD operates to allow for FD communication, simultaneous UL/DL transmission in FR2. Flexible TDD capability may be present at either a base station or UE, or both. For example, for a UE, UL transmission may be from one antenna panel and DL reception may be in another antenna panel. FD communication may be conditional on a beam separation of the UL beam and DL beam at the respective antenna panels. As such, improving the manner in which the selection of the UL beam and DL beam for FD communication is performed is desirable. Utilizing FD communication may provide a reduction in latency, such that it may be possible to receive a DL signal in UL only slots, which may enable latency savings. In addition, FD communication may enhance spectrum efficiency per cell or per UE and may allow for a more efficient utilization of resources.

Beam separation of the UL and DL beams assist in limiting or reducing self-interference that may occur during FD communication. It is desirable to select UL and DL beams that are on different antenna panels to minimize self-interference. Determining the UL and DL beams that are separated on their respective antenna panels may provide a reliable FD communication by selecting beam pairs that minimize or reduce self-interference. As such, measuring the self-interference at the UE may assist in determining beam pairs of UL and DL beams that may support FD communication.

An FD UE may perform a sSIM procedure in order to identify self-interference from transmissions of the FD UE. An FD base station also may perform a SIM procedure in order to identify self-interference from transmissions of the FD base station. The FD communications may be TDMed, using fully overlapping frequency resources. Using fully overlapping frequency resources may facilitate communicating with high spectral efficiency but may result in spatial leakage due to cross beam interferences.

Some techniques and apparatuses described herein provide for selection of a frequency overlap based on SIM procedures. In some aspects, the UE may perform SIM procedures corresponding to one or more frequency overlap metrics to determine whether cross beam interference satisfies a threshold. The UE may provide a measurement report to the base station to indicate results of the UE SIM, which may include evaluation of a frequency overlap between UL frequency resources and DL frequency resources, a guard bandwidth between UL frequency resources and DL frequency resources, and/or the like. By measuring and reporting frequency overlap metrics, aspects facilitate selection, by a base station, of a frequency overlap metric that may maximize spectral efficiency while minimizing cross beam interference.

Typically, layer one signal to interference plus noise ratio (L1-SINR) measurement may be performed for beam management purposes. In those measurements, there is no need to specify a quasi co-location relation between a CMR and an IMR, as only an UL beam or a DL beam is being used. However, in full duplex communications, an Rx beam associated with an IMR may use the same Rx beam for a paired CMR. In these cases, not considering the QCL relation between paired beams may result in inaccurate measurements used for selecting beam pairs for the communications. This may mean that the selected beam pair may provide suboptimal or poor performance at the base station, thereby decreasing throughput and consuming computing and communication resources.

According to aspects of techniques and apparatuses described herein, a base station may provide a channel measurement (CM) configuration for a CM process indicating at least one CMR associated with QCL information. In some aspects, the QCL information may correspond to a Tx beam of the base station associated with an Rx beam of the UE. The base station also may provide an IM configuration for an IM process indicating at least one IMR associated with a UE beam pair comprising the Rx beam of the UE and a Tx beam of the UE. The UE may perform a SIM procedure to determine one or more SIM metrics based at least in part on the CM process and the IM process. By taking into account the relevant QCL information, more appropriate beam pairs may be selected, thereby increasing throughput and improving utilization of computing and communication resources.

Figure 9:
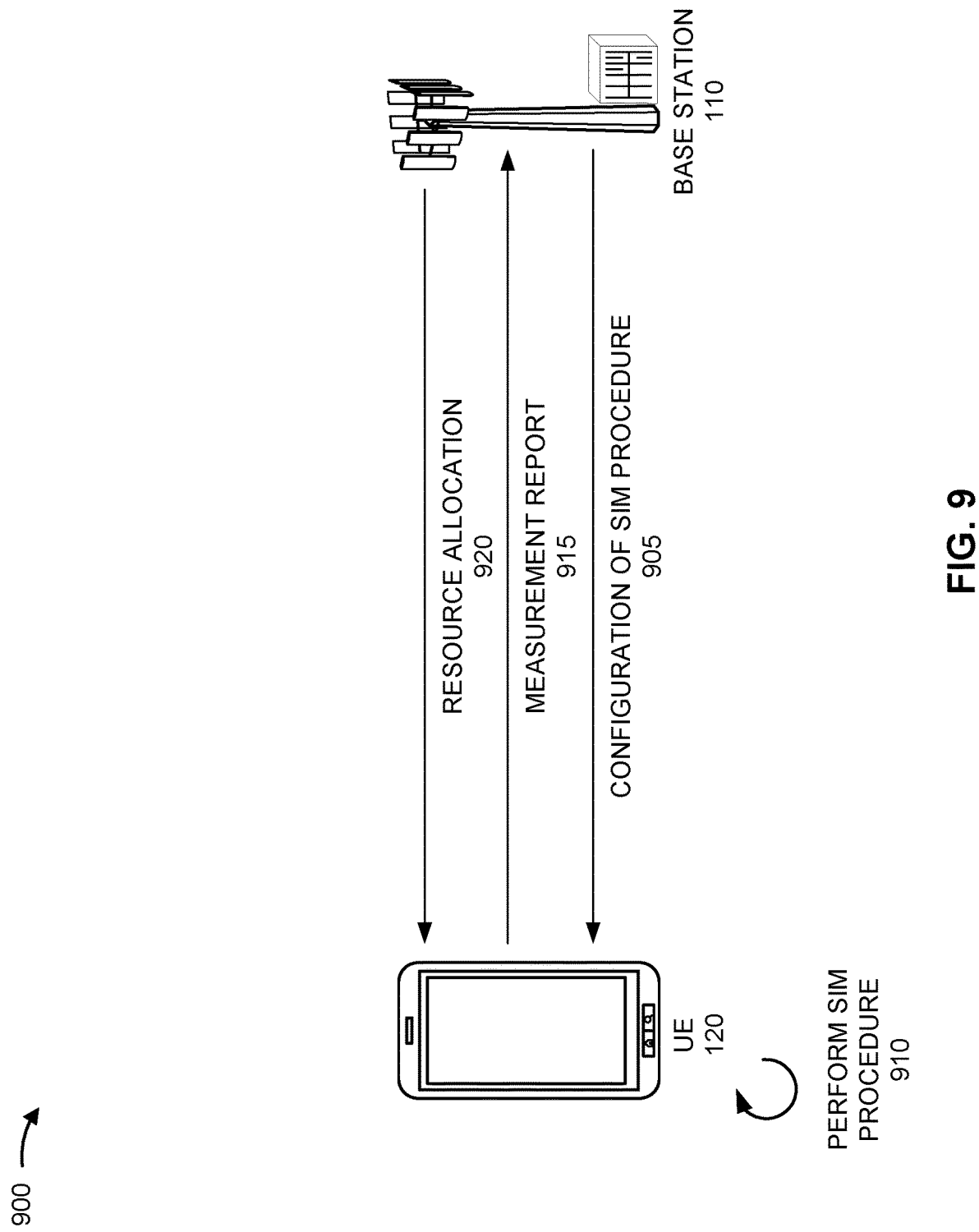
FIG. 9 is a diagram illustrating an example of full duplex self-interference measurement, in accordance with the present disclosure.

FIG. 9 is a diagram illustrating an example 900 of full duplex SIM, in accordance with the present disclosure. As shown, a base station 110 and a UE 120 may communicate with one another.

As shown by reference number 905, the base station 110 may transmit, and the UE 120 may receive, a configuration of a SIM procedure. In some aspects, the configuration of the SIM procedure may include a CM configuration for a CM process indicating at least one CMR associated with QCL information. In some aspects, the QCL information may correspond to a Tx beam of the base station 110 associated with an Rx beam of the UE 120.

In some aspects, the configuration of the SIM procedure may include an IM configuration for an IM process indicating at least one IMR associated with a UE beam pair. The beam pair may include the Rx beam of the UE 120 and a Tx beam of the UE 120. In some aspects, the IM configuration indicates a relation between the CMR and the IMR. The relation may be based at least in part on the QCL information corresponding to the Tx beam of the base station. In some aspects, the CMR and the IMR may be configured in a TDM configuration. In some aspects, the CMR and the IMR may be configured in an FDM configuration.

As shown by reference number 910, the UE 120 may perform the SIM procedure. In some aspects, the UE 120 may perform, in a full duplex communication mode, a SIM procedure to determine one or more SIM metrics associated with the UE beam pair. In some aspects, the SIM procedure may be based at least in part on the CM process and the IM process.

According to various aspects, the one or more SIM metrics may include an L1-SINR, an RSRQ, a CQI, a rank indicator, and/or the like. In some aspects, the SIM procedure may be based at least in part on an L1-SINR, an RSRQ, a CQI, an inter-layer IM configuration, and/or a combination thereof. In some aspects, the inter-layer IM configuration may indicate a rank indicator.

As shown by reference number 915, the UE 120 may transmit, and the base station 110 may receive, a measurement report based at least in part on the SIM procedure. As shown by reference number 920, the base station 110 may transmit, and the UE 120 may receive, a resource allocation. The resource allocation may be based at least in part on the measurement report.

As indicated above, FIG. 9 is provided as an example. Other examples may differ from what is described with regard to FIG. 9.

Figure 10:
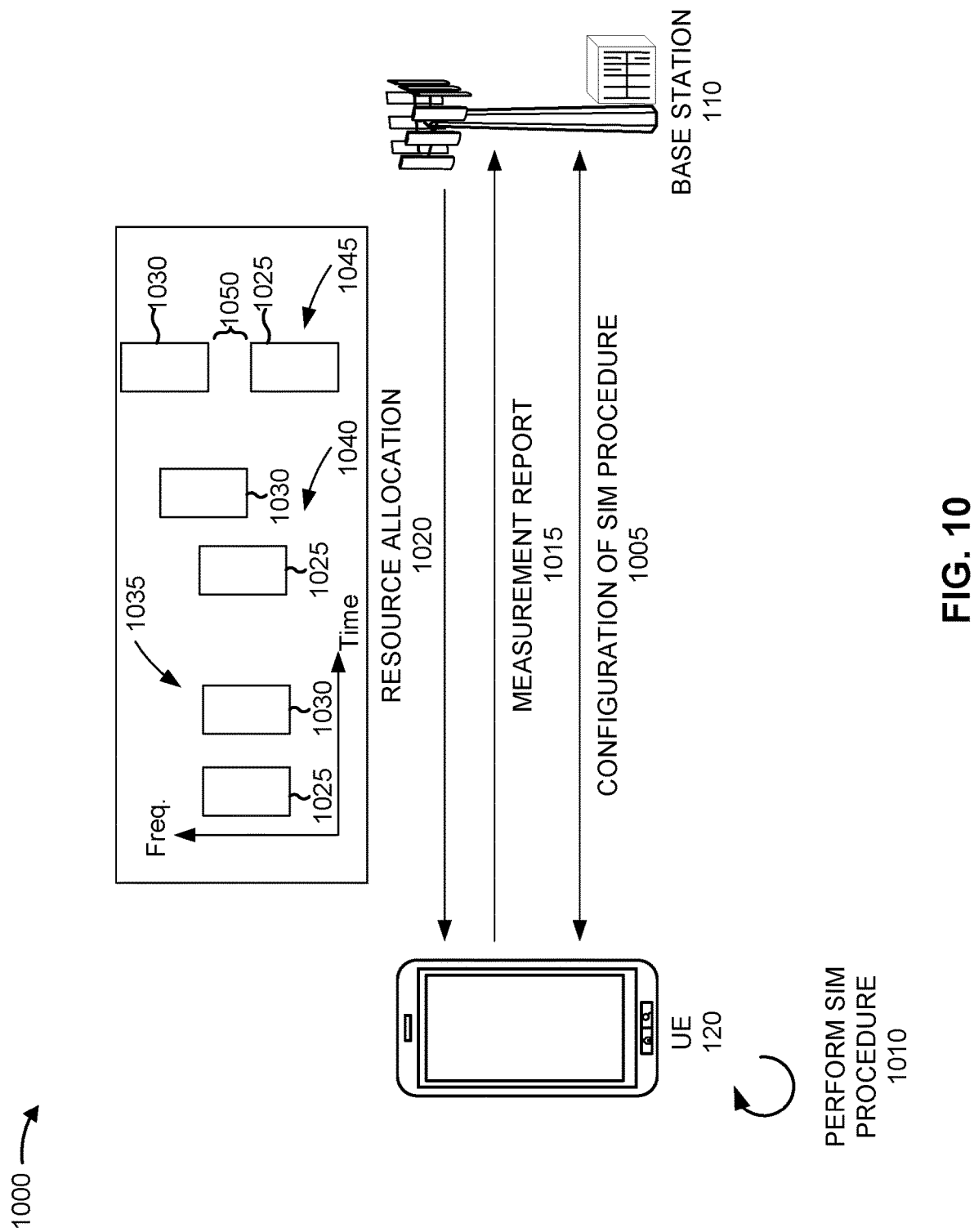
FIG. 10 is a diagram illustrating an example of overlapped bandwidth and guard bandwidth measurement for full duplex transmissions, in accordance with the present disclosure.

FIG. 10 is a diagram illustrating an example 1000 of overlapped bandwidth and guard bandwidth measurement for full duplex transmissions, in accordance with the present disclosure. As shown, a base station 110 and a UE 120 may communicate with one another.

As shown by reference number 1005, the base station 110 may transmit, and the UE 120 may receive, a configuration of a SIM procedure. In some aspects, the SIM procedure may be associated with an Rx beam and a Tx beam of the UE 120. In some aspects, the configuration may include an allocation of a CMR associated with the Rx beam, an allocation of an IMR associated with the Tx beam and the Rx beam, and/or the like.

The SIM procedure may be performed using an uplink (UL) frequency resource associated with a corresponding downlink (DL) frequency resource. In some aspects, the SIM procedure may correspond to a frequency overlap metric, a time alignment between the DL frequency resource and the UL frequency resource, and/or the like. In some aspects, the frequency overlap metric may indicate an overlap between the DL frequency resource and the UL frequency resource. In some aspects, the frequency overlap metric may indicate a guard bandwidth between the DL frequency resource and the UL frequency resource.

As shown by reference number 1010, the UE 120 may perform the SIM procedure. In some aspects, the SIM procedure may be based at least in part on an SRS, a UL DMRS, a physical UL shared channel (PUSCH), a physical UL control channel (PUCCH), and/or the like. In some aspects, the SIM procedure may be based at least in part on a layer 1 signal to interference plus noise ratio (L1-SINR), an RSRP, and/or the like.

In some aspects, the UE 120 may perform the SIM by performing an RSRP measurement associated with the Rx beam based at least in part on the CMR. The UE 120 may measure, based at least in part on the IMR, the RSRP measurement associated with the Rx beam, an RSSI measurement associated with the Rx beam, and/or the like.

In some aspects, a measurement report may indicate an RSRP measurement or an SINR measurement, where the RSRP measurement or the SINR measurement is not associated with a SIM procedure, and a leaked RSSI or an additional RSRP associated with an additional SIM procedure. In some aspects, the measurement report may indicate a quantized RSRP measurement result or a quantized SINR measurement result. In some aspects, the quantized RSRP measurement result or the quantized SINR measurement result may indicate a level, of a plurality of levels. In some aspects, the levels may include a low level, a medium level, and a high level.

In some aspects, the measurement report may indicate an average result over an entire intended DL bandwidth. In some aspects, the frequency overlap metric may correspond to a portion of an intended DL bandwidth. The portion of the intended DL bandwidth may include a resource block. The parameter may be associated with a guard band between a UL bandwidth and the intended DL bandwidth. In some aspects, the portion of the intended DL bandwidth may include a sub-band.

In some aspects, the frequency overlap metric may include an overlap percentage of a UL bandwidth associated with the UL frequency resource that is captured in an intended DL bandwidth associated with the DL frequency resource. The DL frequency resource may correspond to a DL RS that is measured using the SIM procedure. The UL bandwidth may be associated with an SRS, a UL DMRS, a PUSCH, a PUCCH, and/or the like. In aspects, the DL RS may include a CSI-RS.

In aspects, the DL frequency resource may partially overlap the UL frequency resource, and the frequency overlap metric may indicate an overlap percentage. The overlap percentage may indicate a ratio of overlap of a UL bandwidth associated with the UL frequency resource to an intended DL bandwidth associated with the DL frequency resource. In some aspects, the frequency overlap may include a full frequency overlap, and the frequency overlap metric may indicate a one hundred percent overlap. In some aspects, the frequency overlap metric may indicate an overlap percentage that is greater than zero percent and less than one hundred percent.

In some aspects, the SIM may include determining whether a cross beam interference satisfies a threshold or not. If not, the UE 120 may perform an additional SIM procedure associated with the Rx beam and the Tx beam. The additional SIM procedure may correspond to an additional frequency overlap metric between the DL frequency resource and the UL frequency resource, an additional time alignment between the DL frequency resource and the UL frequency resource, and/or the like. In some aspects, any number of additional SIM procedures may be performed with different frequency overlap metrics and/or time alignments until a configuration is identified for which the cross beam interference satisfies the threshold.

In some aspects, the cross beam interference may not satisfy the threshold for all overlap situations. Complete frequency separation may be utilized, where the DL frequency resource does not overlap the UL frequency resource. In some aspects, the frequency overlap metric may indicate a guard bandwidth between a UL bandwidth and an intended DL bandwidth. In embodiments, the frequency overlap metric may indicate a zero percent overlap, a measurement of the guard bandwidth, and/or the like.

As shown by reference number 1015, the UE 120 may transmit, and the base station 110 may receive, a measurement report based at least in part on the SIM procedure, an additional SIM procedure, and/or the like. In some aspects, the measurement report may be transmitted to the base station 110 based at least in part on a determination that a trigger event has occurred. In some aspects, the trigger event may include a change in a SIM that does not satisfy a threshold, receipt of a SIM trigger from the base station 110, and/or the like. In some aspects, the base station 110 may allocate a feedback channel reserved for the measurement report.

In some aspects, the measurement report may indicate a maximum frequency overlap bandwidth associated with partial frequency overlapping. In some aspects, the measurement report may indicate a minimum guard bandwidth between the DL frequency resource and the UL frequency resource. In some aspects, the measurement report may be based at least in part on a bandwidth criterion. The base station 110 may configure the bandwidth criterion. In some aspects, the bandwidth criterion may include a cross beam interference threshold.

As shown by reference number 1020, the base station 110 may transmit, and the UE 120 may receive, a resource allocation and a final selected DL and UL beam pair. The resource allocation may include an indication of a selected frequency relationship between a UL bandwidth and an intended DL bandwidth. In some aspects, the selected frequency relationship may be based at least in part on the measurement report. In some aspects, the selected frequency relationship may correspond to the frequency overlap metric, based at least in part on a determination that a cross beam interference satisfies a threshold.

In some aspects, as shown in FIG. 10, the resource allocation may indicate a first resource 1025 and a second resource 1030 (among any number of other resources), allocated for full duplex communications. In some aspects, the first resource 1025 may include a UL resource and the second resource 1030 may include a DL resource.

The indication of the selected frequency relationship may indicate a relationship, in a frequency domain, between the first resource 1025 and the second resource 1030. As shown by reference number 1035, the first resource 1025 may fully overlap the second resource 1030 in the frequency domain. In that case, the indication of the frequency relationship may include a frequency overlap metric that indicates a one hundred percent overlap.

As shown by reference number 1040, the first resource 1025 may partially overlap the second resource 1030 in the frequency domain. In that case, the indication of the frequency relationship may include a frequency overlap metric that indicates a percent overlap between zero and one hundred. In some aspects, as shown by reference number 1045, there may be no overlap between the first resource 1025 and the second resource 1030 in the frequency domain. In that case, the indication of the frequency relationship may include a frequency overlap metric that indicates a zero percent overlap. In some aspects, the frequency overlap metric may indicate a guard bandwidth 1050 between the first resource 1025 and the second resource 1030 associated with a zero percent overlap.

As indicated above, FIG. 10 is provided as an example. Other examples may differ from what is described with regard to FIG. 10.

Figure 11:
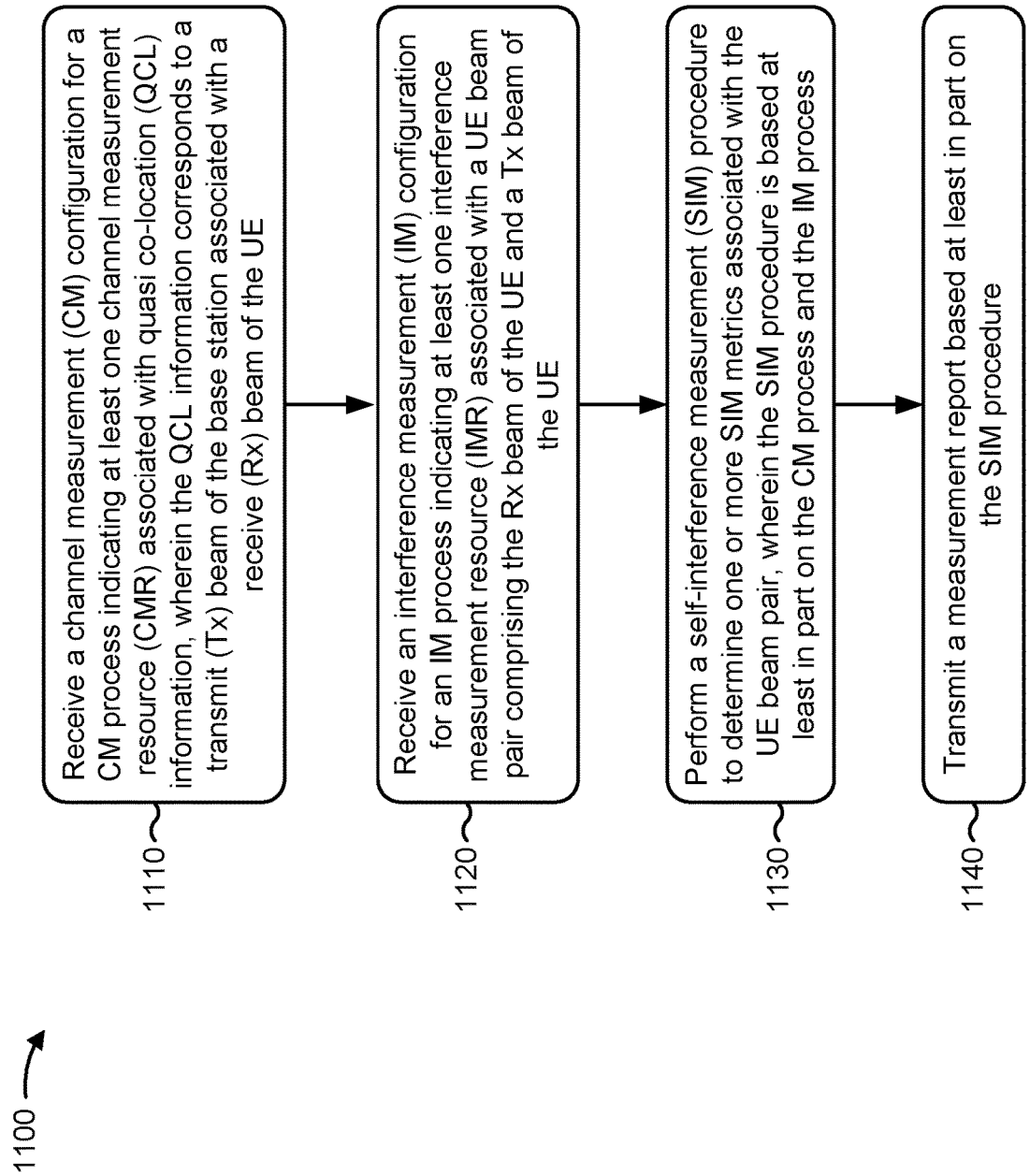
FIG. 11 is a diagram illustrating an example process performed, for example, by a user equipment, in accordance with the present disclosure.

FIG. 11 is a diagram illustrating an example process 1100 performed, for example, by a UE, in accordance with the present disclosure. Example process 1100 is an example where the UE (e.g., UE 120 and/or the like) performs operations associated with QCL relation between a CMR and an IMR for full duplex transmissions.

As shown in FIG. 11, in some aspects, process 1100 may include receiving, from a base station, a CM configuration for a CM process indicating at least one CMR associated with QCL information, wherein the QCL information corresponds to a Tx beam of the base station associated with an Rx beam of the UE (block 1110). For example, the UE (e.g., using receive processor 258, controller/processor 280, memory 282, and/or the like) may receive, from a base station, a CM configuration for a CM process indicating at least one CMR associated with QCL information, as described above. In some aspects, the QCL information corresponds to a Tx beam of the base station associated with an Rx beam of the UE.

As further shown in FIG. 11, in some aspects, process 1100 may include receiving an IM configuration for an IM process indicating at least one IMR associated with a UE beam pair comprising the Rx beam of the UE and a Tx beam of the UE (block 1120). For example, the UE (e.g., using receive processor 258, controller/processor 280, memory 282, and/or the like) may receive an IM configuration for an IM process indicating at least one IMR associated with a UE beam pair comprising the Rx beam of the UE and a Tx beam of the UE, as described above.

As further shown in FIG. 11, in some aspects, process 1100 may include performing, in a full duplex communication mode, a SIM procedure to determine one or more SIM metrics associated with the UE beam pair, wherein the SIM procedure is based at least in part on the CM process and the IM process (block 1130). For example, the UE (e.g., using receive processor 258, transmit processor 264, controller/processor 280, memory 282, and/or the like) may perform, in a full duplex communication mode, a SIM procedure to determine one or more SIM metrics associated with the UE beam pair, as described above. In some aspects, the SIM procedure is based at least in part on the CM process and the IM process.

As further shown in FIG. 11, in some aspects, process 1100 may include transmitting, to the base station, a measurement report based at least in part on the SIM procedure (block 1140). For example, the UE (e.g., using transmit processor 264, controller/processor 280, memory 282, and/or the like) may transmit, to the base station, a measurement report based at least in part on the SIM procedure, as described above.

Process 1100 may include additional aspects, such as any single aspect or any combination of aspects described below and/or in connection with one or more other processes described elsewhere herein.

In a first aspect, the one or more SIM metrics comprise at least one of: an L1-SINR, an RSRQ, a CQI, a rank indicator, or a combination thereof.

In a second aspect, alone or in combination with the first aspect, the SIM procedure is based at least in part on at least one of an L1-SINR measurement configuration, an L1-RSRQ measurement configuration, an L1-CQI measurement configuration, an inter-layer IM configuration, or a combination thereof.

In a third aspect, alone or in combination with one or more of the first and second aspects, the inter-layer IM configuration indicates a rank indicator.

In a fourth aspect, alone or in combination with one or more of the first through third aspects, the IM configuration indicates a relation between the CMR and the IMR, and the relation is based at least in part on the QCL information corresponding to the Tx beam of the base station.

In a fifth aspect, alone or in combination with one or more of the first through fourth aspects, the CMR and the IMR are configured in a TDM configuration.

In a sixth aspect, alone or in combination with one or more of the first through fifth aspects, the CMR and the IMR are configured in a FDM configuration.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
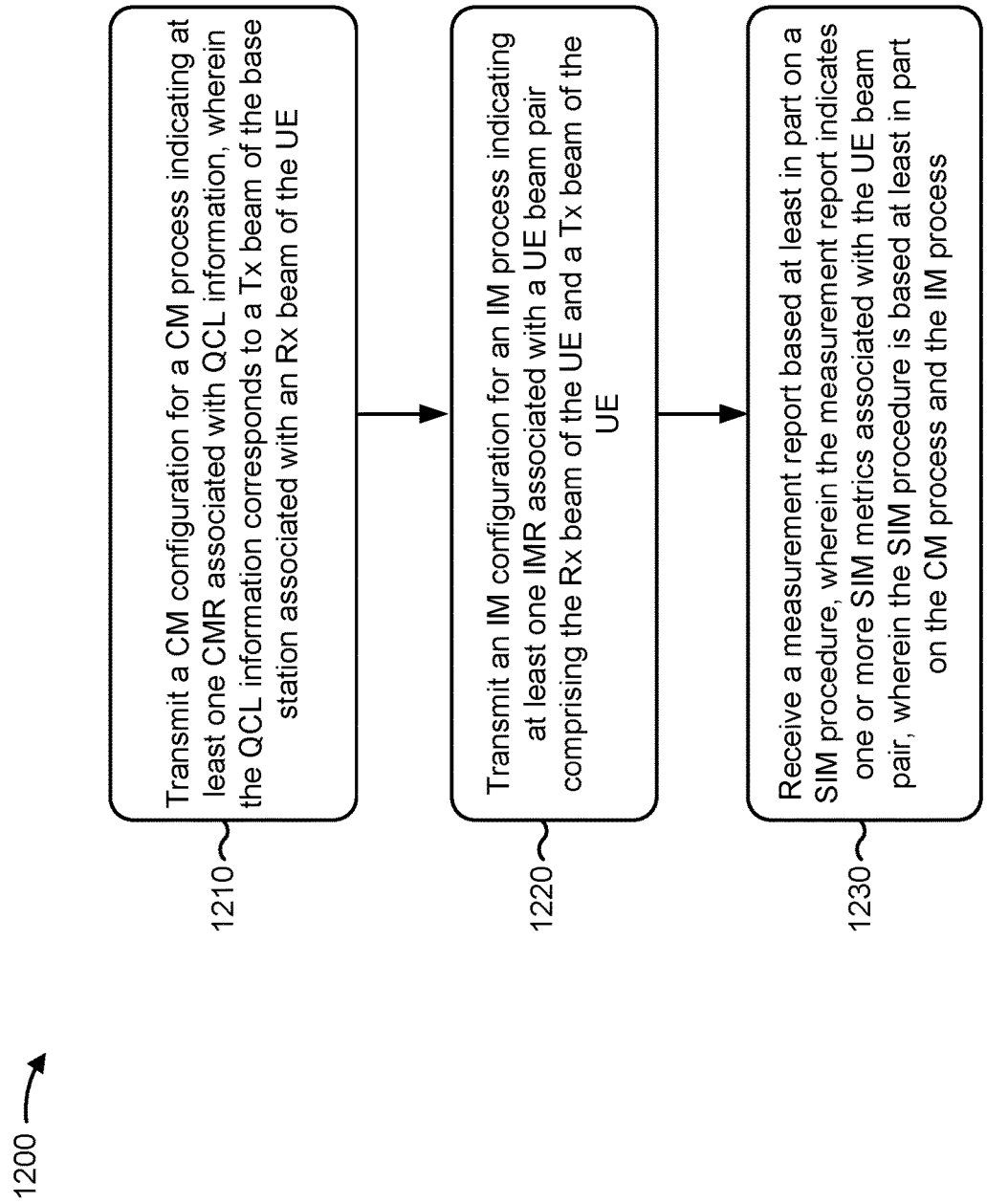
FIG. 12 is a diagram illustrating an example process performed, for example, by a base station, in accordance with the present disclosure.

FIG. 12 is a diagram illustrating an example process 1200 performed, for example, by a base station, in accordance with the present disclosure. Example process 1200 is an example where the base station (e.g., base station 110 and/or the like) performs operations associated with QCL relation between a CMR and an IMR for full duplex transmissions.

As shown in FIG. 12, in some aspects, process 1200 may include transmitting, to a UE, a CM configuration for a CM process indicating at least one CMR associated with QCL information, wherein the QCL information corresponds to a Tx beam of the base station associated with an Rx beam of the UE (block 1210). For example, the base station (e.g., using transmit processor 220, controller/processor 240, memory 242, and/or the like) may transmit, to a UE, a CM configuration for a CM process indicating at least one CMR associated with QCL information, as described above. In some aspects, the QCL information corresponds to a Tx beam of the base station and an Rx beam of the UE.

As further shown in FIG. 12, in some aspects, process 1200 may include transmitting an IM configuration for an IM process indicating at least one IMR associated with a UE beam pair comprising the Rx beam of the UE and a Tx beam of the UE (block 1220). For example, the base station (e.g., using transmit processor 220, controller/processor 240, memory 242, and/or the like) may transmit an IM configuration for an IM process indicating at least one IMR associated with a UE beam pair comprising the Rx beam of the UE and a Tx beam of the UE, as described above.

As further shown in FIG. 12, in some aspects, process 1200 may include receiving, from the UE, a measurement report based at least in part on a SIM procedure, wherein the measurement report indicates one or more SIM metrics associated with the UE beam pair, wherein the SIM procedure is based at least in part on the CM process and the IM process (block 1230). For example, the base station (e.g., using receive processor 238, controller/processor 240, memory 242, and/or the like) may receive, from the UE, a measurement report based at least in part on a SIM procedure, as described above. In some aspects, the measurement report indicates one or more SIM metrics associated with the UE beam pair. In some aspects, the SIM procedure is based at least in part on the CM process and the IM process.

Process 1200 may include additional aspects, such as any single aspect or any combination of aspects described below and/or in connection with one or more other processes described elsewhere herein.

In a first aspect, the one or more SIM metrics comprise at least one of: an L1-SINR, an RSRQ, a CQI, a rank indicator, or a combination thereof.

In a second aspect, alone or in combination with the first aspect, the SIM procedure is based at least in part on at least one of: an L1-SINR measurement configuration, an L1-RSRQ measurement configuration, an L1-CQI measurement configuration, an inter-layer IM configuration, or a combination thereof.

In a third aspect, alone or in combination with one or more of the first and second aspects, the inter-layer IM configuration indicates a rank indicator.

In a fourth aspect, alone or in combination with one or more of the first through third aspects, the IM configuration indicates a relation between the CMR and the IMR, the relation is based at least in part on the QCL information corresponding to the Tx beam of the base station.

In a fifth aspect, alone or in combination with one or more of the first through fourth aspects, the CMR and the IMR are configured in a TDM configuration.

In a sixth aspect, alone or in combination with one or more of the first through fifth aspects, the CMR and the IMR are configured in a FDM configuration.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
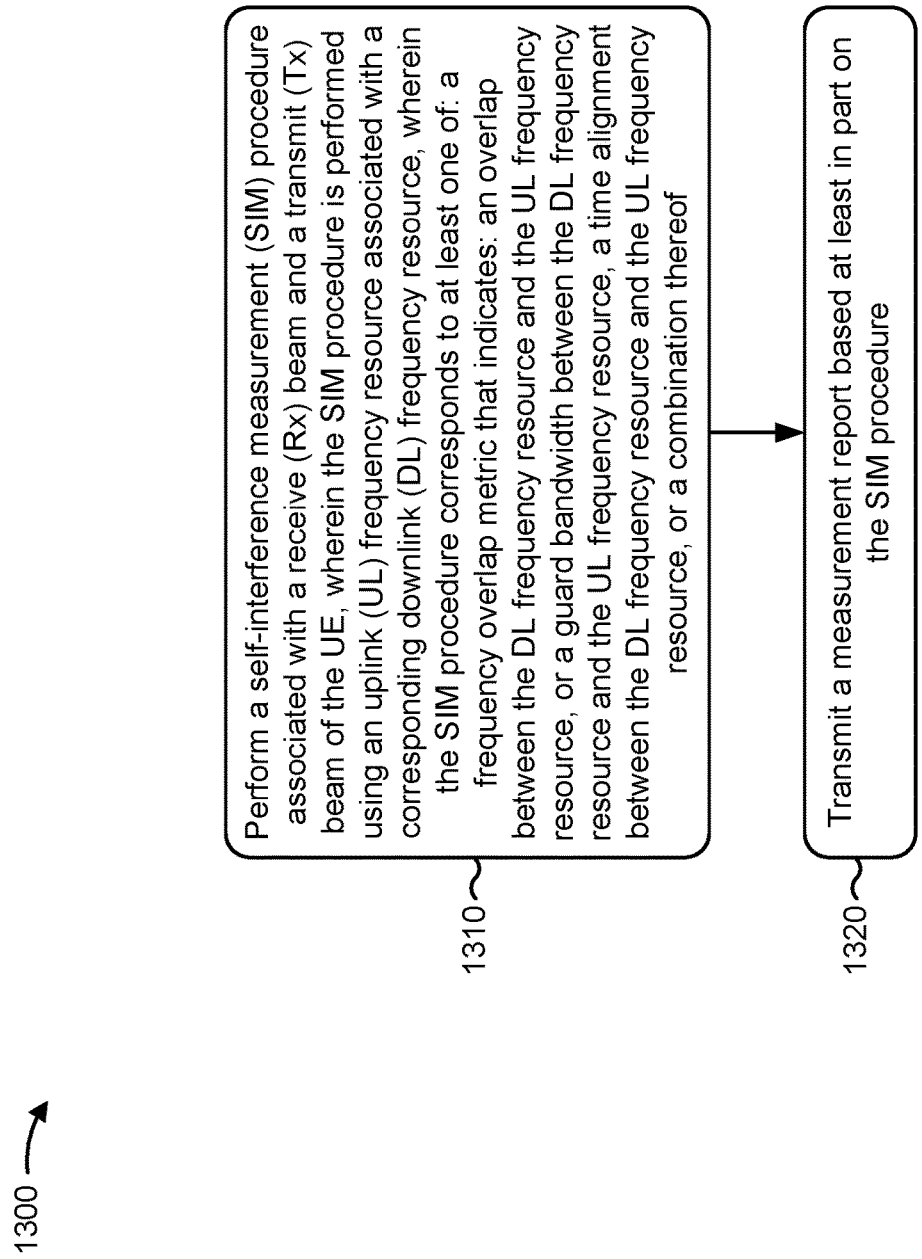
FIG. 13 is a diagram illustrating an example process performed, for example, by a user equipment, in accordance with the present disclosure.

FIG. 13 is a diagram illustrating an example process 1300 performed, for example, by a UE, in accordance with the present disclosure. Example process 1300 is an example where the UE (e.g., UE 120 and/or the like) performs operations associated with overlapped bandwidth and guard bandwidth measurement for full duplex transmissions.

As shown in FIG. 13, in some aspects, process 1300 may include performing, in a full duplex communication mode, a SIM procedure associated with an Rx beam and a Tx beam of the UE, wherein the SIM procedure is performed using a UL frequency resource associated with a corresponding DL frequency resource, wherein the SIM procedure corresponds to at least one of: a frequency overlap metric that indicates: an overlap between the DL frequency resource and the UL frequency resource, or a guard bandwidth between the DL frequency resource and the UL frequency resource, a time alignment between the DL frequency resource and the UL frequency resource, or a combination thereof (block 1310). For example, the UE (e.g., using receive processor 258, transmit processor 264, controller/processor 280, memory 282, and/or the like) may perform, in a full duplex communication mode, a SIM procedure associated with an Rx beam and a Tx beam of the UE, as described above. In some aspects, the SIM procedure is performed using a UL frequency resource associated with a corresponding DL frequency resource. In some aspects, the SIM procedure corresponds to at least one of a frequency overlap metric that indicates: an overlap between the DL frequency resource and the UL frequency resource, or a guard bandwidth between the DL frequency resource and the UL frequency resource, a time alignment between the DL frequency resource and the UL frequency resource, or a combination thereof.

As further shown in FIG. 13, in some aspects, process 1300 may include transmitting, to a base station, a measurement report based at least in part on the SIM procedure (block 1320). For example, the UE (e.g., using transmit processor 264, controller/processor 280, memory 282, and/or the like) may transmit, to a base station, a measurement report based at least in part on the SIM procedure, as described above.

Process 1300 may include additional aspects, such as any single aspect or any combination of aspects described below and/or in connection with one or more other processes described elsewhere herein.

In a first aspect, the SIM procedure is based at least in part on at least one of: an SRS, a UL DMRS, a PUSCH, a PUCCH, or a combination thereof.

In a second aspect, alone or in combination with the first aspect, the frequency overlap metric comprises an overlap percentage of a UL bandwidth associated with the UL frequency resource that is captured in an intended DL bandwidth associated with the DL frequency resource, where the DL frequency resource corresponds to a DL RS that is measured using the SIM procedure.

In a third aspect, alone or in combination with one or more of the first and second aspects, the UL bandwidth is associated with at least one of: an SRS, a UL DMRS, a PUSCH, a PUCCH, or a combination thereof.

In a fourth aspect, alone or in combination with one or more of the first through third aspects, the DL RS comprises a CSI-RS.

In a fifth aspect, alone or in combination with one or more of the first through fourth aspects, the SIM procedure is based at least in part on at least one of: an L1-SINR, an RSRP, or a combination thereof.

In a sixth aspect, alone or in combination with one or more of the first through fifth aspects, the DL frequency resource partially overlaps the UL frequency resource, and the frequency overlap metric indicates an overlap percentage that indicates a ratio of overlap of a UL bandwidth associated with the UL frequency resource to an intended DL bandwidth associated with the DL frequency resource.

In a seventh aspect, alone or in combination with one or more of the first through sixth aspects, the frequency overlap comprises a full frequency overlap, and the frequency overlap metric indicates a one hundred percent overlap.

In an eighth aspect, alone or in combination with one or more of the first through seventh aspects, the DL frequency resource does not overlap the UL frequency resource, and the frequency overlap metric indicates a guard bandwidth between the DL frequency resource and the UL frequency resource.

In a ninth aspect, alone or in combination with one or more of the first through eighth aspects, the frequency overlap comprises a non frequency overlap, and wherein the frequency overlap metric indicates a zero percent overlap.

In a tenth aspect, alone or in combination with one or more of the first through ninth aspects, the frequency overlap metric indicates an overlap percentage that is greater than or equal to zero percent and less than or equal to one hundred percent.

In an eleventh aspect, alone or in combination with one or more of the first through tenth aspects, process 1300 includes receiving, from the base station, an indication of a selected frequency relationship between a UL bandwidth and an intended DL bandwidth, wherein the selected frequency relationship is based at least in part on the measurement report.

In a twelfth aspect, alone or in combination with one or more of the first through eleventh aspects, the selected frequency relationship corresponds to the frequency overlap metric based at least in part on a determination that a cross beam interference satisfies a threshold with a full frequency overlap SIM.

In a thirteenth aspect, alone or in combination with one or more of the first through twelfth aspects, process 1300 includes performing an additional SIM procedure associated with the Rx beam and the Tx beam, wherein, based at least in part on a determination of a cross beam interference associated with the SIM procedure, the additional SIM procedure corresponds to: an additional frequency overlap metric between the DL frequency resource and the UL frequency resource, that indicates: an additional overlap between the DL frequency resource and the UL frequency resource, or an additional guard bandwidth between the DL frequency resource and the UL frequency resource, an additional time alignment between the DL frequency resource and the UL frequency resource, or a combination thereof.

In a fourteenth aspect, alone or in combination with one or more of the first through thirteenth aspects, the measurement report is based at least in part on the additional SIM procedure.

In a fifteenth aspect, alone or in combination with one or more of the first through fourteenth aspects, the additional frequency overlap metric is not equal to the frequency overlap metric based at least in part on a determination that the cross beam interference satisfies a threshold.

In a sixteenth aspect, alone or in combination with one or more of the first through fifteenth aspects, the frequency overlap metric indicates a greater frequency overlap or a smaller guard bandwidth than a frequency overlap or a guard bandwidth indicated by the additional frequency overlap metric.

In a seventeenth aspect, alone or in combination with one or more of the first through sixteenth aspects, the additional time alignment is not the same as the time alignment based at least in part on a determination that the cross beam interference satisfies a threshold.

In an eighteenth aspect, alone or in combination with one or more of the first through seventeenth aspects, the measurement report indicates an RSRP measurement or an SINR measurement, wherein the RSRP measurement or the SINR measurement is not associated with a SIM procedure; and a leaked RSSI or an additional RSRP associated with an additional SIM procedure.

In a nineteenth aspect, alone or in combination with one or more of the first through eighteenth aspects, process 1300 includes receiving an allocation of a CMR associated with the Rx beam; receiving an allocation of IMR associated with the Tx beam and the Rx beam; performing the RSRP measurement associated with the Rx beam based at least in part on the CMR; and measuring, based at least in part on the IMR, at least one of: the RSRP measurement associated with the Rx beam, an RSSI measurement associated with the Rx beam, or a combination thereof.

In a twentieth aspect, alone or in combination with one or more of the first through nineteenth aspects, the measurement report indicates an SINR associated with the SIM procedure.

In a twenty-first aspect, alone or in combination with one or more of the first through twentieth aspects, the SINR is determined based at least in part on a ratio of a channel measurement result associated with a CMR to a SIM procedure result associated with an IMR.

In a twenty-second aspect, alone or in combination with one or more of the first through twenty-first aspects, the measurement report indicates a quantized RSRP measurement result or a quantized SINR measurement result.

In a twenty-third aspect, alone or in combination with one or more of the first through twenty-second aspects, the quantized RSRP measurement result or the quantized SINR measurement result indicates a level of a plurality of levels comprising a low level, a medium level, and a high level.

In a twenty-fourth aspect, alone or in combination with one or more of the first through twenty-third aspects, the measurement report indicates an average result over an entire intended DL bandwidth.

In a twenty-fifth aspect, alone or in combination with one or more of the first through twenty-fourth aspects, the measurement report corresponds to a portion of an intended DL bandwidth.

In a twenty-sixth aspect, alone or in combination with one or more of the first through twenty-fifth aspects, the portion of the intended DL bandwidth comprises a resource block.

In a twenty-seventh aspect, alone or in combination with one or more of the first through twenty-sixth aspects, the portion of the intended DL bandwidth comprises a sub-band.

In a twenty-eighth aspect, alone or in combination with one or more of the first through twenty-seventh aspects, the measurement report indicates a maximum frequency overlap bandwidth associated with partial frequency overlapping or a minimum guard bandwidth between the DL frequency resource and the UL frequency resource based at least in part on a bandwidth criterion.

In a twenty-ninth aspect, alone or in combination with one or more of the first through twenty-eighth aspects, the bandwidth criterion comprises a cross beam interference threshold.

In a thirtieth aspect, alone or in combination with one or more of the first through twenty-ninth aspects, the measurement report is transmitted to the base station based at least in part on a determination that a trigger event has occurred.

In a thirty-first aspect, alone or in combination with one or more of the first through thirtieth aspects, process 1300 includes receiving, from the base station, an allocation of a feedback channel reserved for the measurement report, wherein the measurement report is transmitted using the feedback channel.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
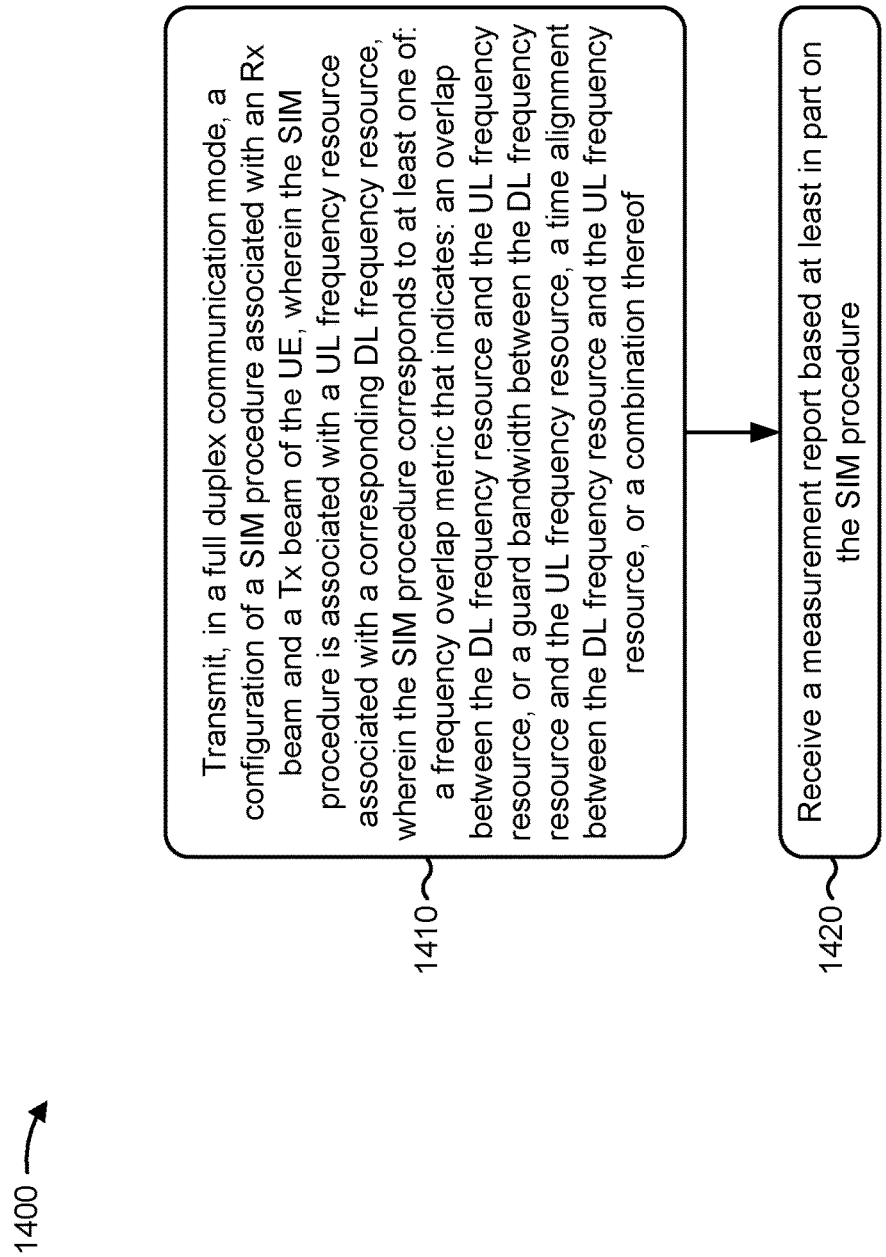
FIG. 14 is a diagram illustrating an example process performed, for example, by a base station, in accordance with the present disclosure.

FIG. 14 is a diagram illustrating an example process 1400 performed, for example, by a base station, in accordance with various aspects of the present disclosure. Example process 1400 is an example where the base station (e.g., base station 110 and/or the like) performs operations associated with overlapped bandwidth and guard bandwidth measurement for full duplex transmissions.

As shown in FIG. 14, in some aspects, process 1400 may include transmitting, to a UE, in a full duplex communication mode, a configuration of a SIM procedure associated with an Rx beam and a Tx beam of the UE, wherein the SIM procedure is associated with a UL frequency resource associated with a corresponding DL frequency resource, wherein the SIM procedure corresponds to at least one of: a frequency overlap metric that indicates: an overlap between the DL frequency resource and the UL frequency resource, or a guard bandwidth between the DL frequency resource and the UL frequency resource, a time alignment between the DL frequency resource and the UL frequency resource, or a combination thereof (block 1410). For example, the base station (e.g., using transmit processor 220, controller/processor 240, memory 242, and/or the like) may transmit, to a UE, in a full duplex communication mode, a configuration of a SIM procedure associated with an Rx beam and a Tx beam of the UE, as described above. In some aspects, the SIM procedure is associated with a UL frequency resource associated with a corresponding DL frequency resource. In some aspects, the SIM procedure corresponds to at least one of a frequency overlap metric that indicates: an overlap between the DL frequency resource and the UL frequency resource, or a guard bandwidth between the DL frequency resource and the UL frequency resource, a time alignment between the DL frequency resource and the UL frequency resource, or a combination thereof.

As further shown in FIG. 14, in some aspects, process 1400 may include receiving, from the UE, a measurement report based at least in part on the SIM procedure (block 1420). For example, the base station (e.g., using receive processor 238, controller/processor 240, memory 242, and/or the like) may receive, from the UE, a measurement report based at least in part on the SIM procedure, as described above.

Process 1400 may include additional aspects, such as any single aspect or any combination of aspects described below and/or in connection with one or more other processes described elsewhere herein.

In a first aspect, the SIM procedure is based at least in part on at least one of an SRS, a UL DMRS, a PUSCH, a PUCCH, or a combination thereof.

In a second aspect, alone or in combination with the first aspect, the frequency overlap metric comprises an overlap percentage of a UL bandwidth associated with the UL frequency resource that is captured in an intended DL bandwidth associated with the DL frequency resource, and the DL frequency resource corresponds to a DL RS that is measured using the SIM procedure.

In a third aspect, alone or in combination with one or more of the first and second aspects, the UL bandwidth is associated with at least one of: an SRS, a UL DMRS, a PUSCH, a PUCCH, or a combination thereof.

In a fourth aspect, alone or in combination with one or more of the first through third aspects, the DL RS comprises a CSI-RS.

In a fifth aspect, alone or in combination with one or more of the first through fourth aspects, the SIM procedure is based at least in part on at least one of: an L1-SINR, an RSRP, or a combination thereof.

In a sixth aspect, alone or in combination with one or more of the first through fifth aspects, the DL frequency resource partially overlaps the UL frequency resource, and the frequency overlap metric indicates an overlap percentage that indicates a ratio of overlap of a UL bandwidth associated with the UL frequency resource to an intended DL bandwidth associated with the DL frequency resource.

In a seventh aspect, alone or in combination with one or more of the first through sixth aspects, the frequency overlap comprises a full frequency overlap, and the frequency overlap metric indicates a one hundred percent overlap.

In an eighth aspect, alone or in combination with one or more of the first through seventh aspects, the DL frequency resource does not overlap the UL frequency resource, and the frequency overlap metric indicates a guard bandwidth between the DL frequency resource and the UL frequency resource.

In a ninth aspect, alone or in combination with one or more of the first through eighth aspects, the frequency overlap comprises a non frequency overlap, and the frequency overlap metric indicates a zero percent overlap.

In a tenth aspect, alone or in combination with one or more of the first through ninth aspects, the frequency overlap metric indicates an overlap percentage that is greater than or equal to zero percent and less than or equal to one hundred percent.

In an eleventh aspect, alone or in combination with one or more of the first through tenth aspects, process 1400 includes transmitting, to the UE, an indication of a selected frequency relationship between a UL bandwidth and an intended DL bandwidth, wherein the selected frequency relationship is based at least in part on the measurement report.

In a twelfth aspect, alone or in combination with one or more of the first through eleventh aspects, the selected frequency relationship corresponds to the frequency overlap metric based at least in part on a determination that a cross beam interference satisfies a threshold with a full frequency overlap SIM.

In a thirteenth aspect, alone or in combination with one or more of the first through twelfth aspects, the measurement report is based at least in part on an additional SIM procedure associated with the Rx beam and the Tx beam, wherein, based at least in part on a determination of a cross beam interference associated with the SIM procedure, the additional SIM procedure corresponds to: an additional frequency overlap metric between the DL frequency resource and the UL frequency resource, that indicates an additional overlap between the DL frequency resource and the UL frequency resource, or an additional guard bandwidth between the DL frequency resource and the UL frequency resource, an additional time alignment between the DL frequency resource and the UL frequency resource, or a combination thereof.

In a fourteenth aspect, alone or in combination with one or more of the first through thirteenth aspects, the measurement report is based at least in part on the additional SIM procedure.

In a fifteenth aspect, alone or in combination with one or more of the first through fourteenth aspects, the additional frequency overlap metric is not equal to the frequency overlap metric based at least in part on a determination that the cross beam interference satisfies a threshold.

In a sixteenth aspect, alone or in combination with one or more of the first through fifteenth aspects, the frequency overlap metric indicates a greater frequency overlap or a smaller guard bandwidth than a frequency overlap indicated by the additional frequency overlap metric.

In a seventeenth aspect, alone or in combination with one or more of the first through sixteenth aspects, the additional time alignment is not the same as the time alignment based at least in part on a determination that the cross beam interference satisfies a threshold.

In an eighteenth aspect, alone or in combination with one or more of the first through seventeenth aspects, the measurement report indicates an RSRP measurement or an SINR measurement, wherein the RSRP measurement or the SINR measurement is not associated with a SIM procedure; and a leaked RSSI or an additional RSRP associated with an additional SIM procedure.

In a nineteenth aspect, alone or in combination with one or more of the first through eighteenth aspects, process 1400 includes transmitting an allocation of a CMR associated with the Rx beam; transmitting an allocation of an IMR associated with the Tx beam and the Rx beam; receiving a result of the RSRP measurement associated with the Rx beam based at least in part on the CMR; and receiving a result of a measurement, based at least in part on the IMR, of at least one of: the RSRP measurement associated with the Rx beam, an RSSI measurement associated with the Rx beam, or a combination thereof.

In a twentieth aspect, alone or in combination with one or more of the first through nineteenth aspects, the measurement report indicates an SINR associated with the SIM.

In a twenty-first aspect, alone or in combination with one or more of the first through twentieth aspects, the SINR is determined based at least in part on a ratio of a CM result associated with a CMR to a SIM procedure result associated with an IMR.

In a twenty-second aspect, alone or in combination with one or more of the first through twenty-first aspects, the measurement report indicates a quantized RSRP measurement result or a quantized SINR measurement result.

In a twenty-third aspect, alone or in combination with one or more of the first through twenty-second aspects, the quantized RSRP measurement result or the quantized SINR measurement result indicates a level of a plurality of levels comprising a low level, a medium level, and a high level.

In a twenty-fourth aspect, alone or in combination with one or more of the first through twenty-third aspects, the measurement report indicates an average result over an entire intended DL bandwidth.

In a twenty-fifth aspect, alone or in combination with one or more of the first through twenty-fourth aspects, the measurement report indicates a result that corresponds to a portion of an intended DL bandwidth.

In a twenty-sixth aspect, alone or in combination with one or more of the first through twenty-fifth aspects, the portion of the intended DL bandwidth comprises a resource block.

In a twenty-seventh aspect, alone or in combination with one or more of the first through twenty-sixth aspects, the portion of the intended DL bandwidth comprises a sub-band.

In a twenty-eighth aspect, alone or in combination with one or more of the first through twenty-seventh aspects, the measurement report indicates a maximum frequency overlap bandwidth associated with partial frequency overlapping or a minimum guard bandwidth between the DL frequency resource and the UL frequency resource based at least in part on a bandwidth criterion.

In a twenty-ninth aspect, alone or in combination with one or more of the first through twenty-eighth aspects, the bandwidth criterion comprises a cross beam interference threshold.

In a thirtieth aspect, alone or in combination with one or more of the first through twenty-ninth aspects, the measurement report is transmitted to the base station based at least in part on a determination that a trigger event has occurred.

In a thirty-first aspect, alone or in combination with one or more of the first through thirtieth aspects, process 1400 includes transmitting, to the UE, an allocation of a feedback channel reserved for the measurement report, where the measurement report is transmitted using the feedback channel.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

The following provides an overview of some Aspects of the present disclosure:

Aspect 1: A method of wireless communication performed by a user equipment (UE), comprising: receiving, from a base station, a channel measurement (CM) configuration for a CM process indicating at least one channel measurement resource (CMR) associated with quasi co-location (QCL) information, wherein the QCL information corresponds to a transmit (Tx) beam of the base station associated with an Rx beam of the UE; receiving an interference measurement (IM) configuration for an IM process indicating at least one interference measurement resource (IMR) associated with a UE beam pair comprising the Rx beam of the UE and a Tx beam of the UE; performing, in a full duplex communication mode, a self-interference measurement (SIM) procedure to determine one or more SIM metrics associated with the UE beam pair, wherein the SIM procedure is based at least in part on the CM process and the IM process; and transmitting, to the base station, a measurement report based at least in part on the SIM procedure.

Aspect 2: The method of Aspect 1, wherein the one or more SIM metrics comprise at least one of: a layer one signal to interference plus noise ratio, a reference signal received quality, a channel quality indicator, a rank indicator, or a combination thereof.

Aspect 3: The method of either of Aspects 1 or 2, wherein the SIM procedure is based at least in part on at least one of: a layer one signal to interference plus noise ratio measurement configuration, a layer one reference signal received quality measurement configuration, a layer one channel quality indicator measurement configuration, an inter-layer interference measurement configuration, or a combination thereof.

Aspect 4: The method of Aspect 3, wherein the inter-layer interference measurement configuration indicates a rank indicator.

Aspect 5: The method of any of Aspects 1-4, wherein the IM configuration indicates a relation between the CMR and the IMR, wherein the relation is based at least in part on the QCL information corresponding to the Tx beam of the base station.

Aspect 6: The method of any of Aspects 1-5, wherein the CMR and the IMR are configured in a time division multiplexed configuration.

Aspect 7: The method of any of Aspects 1-6, wherein the CMR and the IMR are configured in a frequency division multiplexed configuration.

Aspect 8: A method of wireless communication performed by a base station, comprising: transmitting, to a user equipment (UE), a channel measurement (CM) configuration for a CM process indicating at least one channel measurement resource (CMR) associated with quasi co-location (QCL) information, wherein the QCL information corresponds to a transmit (Tx) beam of the base station associated with an Rx beam of the UE; transmitting an interference measurement (IM) configuration for an IM process indicating at least one interference measurement resource (IMR) associated with a UE beam pair comprising the Rx beam of the UE and a Tx beam of the UE; and receiving, from the UE, a measurement report based at least in part on a self-interference measurement (SIM) procedure, wherein the measurement report indicates one or more SIM metrics associated with the UE beam pair, wherein the SIM procedure is based at least in part on the CM process and the IM process.

Aspect 9: The method of Aspect 8, wherein the one or more SIM metrics comprise at least one of: a layer one signal to interference plus noise ratio, a reference signal received quality, a channel quality indicator, a rank indicator, or a combination thereof.

Aspect 10: The method of either of Aspects 8 or 9, wherein the SIM procedure is based at least in part on at least one of: a layer one signal to interference plus noise ratio measurement configuration, a layer one reference signal received quality measurement configuration, a layer one channel quality indicator measurement configuration, an inter-layer interference measurement configuration, or a combination thereof.

Aspect 11: The method of Aspect 10, wherein the inter-layer interference measurement configuration indicates a rank indicator.

Aspect 12: The method of any of Aspects 8-11, wherein the IM configuration indicates a relation between the CMR and the IMR, wherein the relation is based at least in part on the QCL information corresponding to the Tx beam of the base station.

Aspect 13: The method of any of Aspects 8-12, wherein the CMR and the IMR are configured in a time division multiplexed configuration.

Aspect 14: The method of any of Aspects 8-13, wherein the CMR and the IMR are configured in a frequency division multiplexed configuration.

Aspect 15: A method of wireless communication performed by a user equipment (UE), comprising: performing, in a full duplex communication mode, a self-interference measurement (SIM) procedure associated with a receive (Rx) beam and a transmit (Tx) beam of the UE, wherein the SIM procedure is performed using an uplink (UL) frequency resource associated with a corresponding downlink (DL) frequency resource, wherein the SIM procedure corresponds to at least one of: a frequency overlap metric that indicates: an overlap between the DL frequency resource and the UL frequency resource, or a guard bandwidth between the DL frequency resource and the UL frequency resource, a time alignment between the DL frequency resource and the UL frequency resource, or a combination thereof; and transmitting, to a base station, a measurement report based at least in part on the SIM procedure.

Aspect 16: The method of Aspect 15, wherein the SIM procedure is based at least in part on at least one of: a sounding reference signal, a UL demodulation reference signal, a physical UL shared channel, a physical UL control channel, or a combination thereof.

Aspect 17: The method of either of Aspects 15 or 16, wherein the frequency overlap metric comprises an overlap percentage of a UL bandwidth associated with the UL frequency resource that is captured in an intended DL bandwidth associated with the DL frequency resource, wherein the DL frequency resource corresponds to a DL RS that is measured using the SIM procedure.

Aspect 18: The method of Aspect 17, wherein the UL bandwidth is associated with at least one of: a sounding RS, a UL demodulation RS, a physical UL shared channel, a physical UL control channel, or a combination thereof.

Aspect 19: The method of either of Aspects 17 or 18, wherein the DL RS comprises a channel state information RS.

Aspect 20: The method of any of Aspects 17-19, wherein the SIM procedure is based at least in part on at least one of: a layer 1 signal to interference plus noise ratio, a reference signal received power, or a combination thereof.

Aspect 21: The method of any of Aspects 15-20, wherein the DL frequency resource partially overlaps the UL frequency resource, and wherein the frequency overlap metric indicates an overlap percentage that indicates a ratio of overlap of a UL bandwidth associated with the UL frequency resource to an intended DL bandwidth associated with the DL frequency resource.

Aspect 22: The method of Aspect 21, wherein the frequency overlap comprises a full frequency overlap, and wherein the frequency overlap metric indicates a one hundred percent overlap.

Aspect 23: The method of any of Aspects 15-20, wherein the DL frequency resource does not overlap with the UL frequency resource, and wherein the frequency overlap metric indicates a guard bandwidth between the DL frequency resource and the UL frequency resource.

Aspect 24: The method of Aspect 23, wherein the frequency overlap comprises a non frequency overlap, and wherein the frequency overlap metric indicates a zero percent overlap.

Aspect 25: The method of any of Aspects 15-24, wherein the frequency overlap metric indicates an overlap percentage that is greater than or equal to zero percent and less than or equal to one hundred percent.

Aspect 26: The method of any of Aspects 15-25, further comprising: receiving, from the base station, an indication of a selected frequency relationship between a UL bandwidth and an intended DL bandwidth, wherein the selected frequency relationship is based at least in part on the measurement report.

Aspect 27: The method of Aspect 26, wherein the selected frequency relationship corresponds to the frequency overlap metric based at least in part on a determination that a cross beam interference satisfies a threshold with a full frequency overlap SIM.

Aspect 28: The method of any of Aspects 15-27, further comprising: performing an additional SIM procedure associated with the Rx beam and the Tx beam, wherein, based at least in part on a determination of a cross beam interference associated with the SIM procedure, the additional SIM procedure corresponds to: an additional frequency overlap metric between the DL frequency resource and the UL frequency resource, that indicates: an additional overlap between the DL frequency resource and the UL frequency resource, or an additional guard bandwidth between the DL frequency resource and the UL frequency resource, an additional time alignment between the DL frequency resource and the UL frequency resource, or a combination thereof.

Aspect 29: The method of Aspect 28, wherein the measurement report is based at least in part on the additional SIM procedure.

Aspect 30: The method of either of Aspects 28 or 29, wherein the additional frequency overlap metric is not equal to the frequency overlap metric based at least in part on a determination that the cross beam interference satisfies a threshold.

Aspect 31: The method of Aspect 30, wherein the frequency overlap metric indicates a greater frequency overlap or a smaller guard bandwidth than a frequency overlap or a guard bandwidth indicated by the additional frequency overlap metric.

Aspect 32: The method of any of Aspects 28-31, wherein the additional time alignment is not the same as the time alignment based at least in part on a determination that the cross beam interference satisfies a threshold.

Aspect 33: The method of any of Aspects 15-32, wherein the measurement report indicates: a reference signal received power (RSRP) measurement or a signal to interference plus noise ratio (SINR) measurement, wherein the RSRP measurement or the SINR measurement is not associated with a SIM procedure; and a leaked received signal strength indicator (RSSI) or an additional RSRP associated with an additional SIM procedure.

Aspect 34: The method of Aspect 33, further comprising: receiving an allocation of a channel measurement resource (CMR) associated with the Rx beam; receiving an allocation of an interference measurement resource (IMR) associated with the Tx beam and the Rx beam; performing the RSRP measurement associated with the Rx beam based at least in part on the CMR; and measuring, based at least in part on the IMR, at least one of: the RSRP measurement associated with the Rx beam, an RSSI measurement associated with the Rx beam, or a combination thereof.

Aspect 35: The method of any of Aspects 15-34, wherein the measurement report indicates a signal to interference plus noise ratio (SINR) associated with the SIM procedure.

Aspect 36: The method of Aspect 35, wherein the SINR is determined based at least in part on a ratio of a channel measurement result associated with a channel measurement resource to a SIM procedure result associated with an interference measurement resource.

Aspect 37: The method of any of Aspects 15-36, wherein the measurement report indicates a quantized reference signal received power (RSRP) measurement result or a quantized signal to interference plus noise ratio (SINR) measurement result.

Aspect 38: The method of Aspect 37, wherein the quantized RSRP measurement result or the quantized SINK measurement result indicates a level of a plurality of levels comprising a low level, a medium level, and a high level.

Aspect 39: The method of any of Aspects 15-38, wherein the measurement report indicates an average result over an entire intended DL bandwidth.

Aspect 40: The method of any of Aspects 15-39, wherein the measurement report indicates a result that corresponds to a portion of an intended DL bandwidth.

Aspect 41: The method of Aspect 40, wherein the portion of the intended DL bandwidth comprises a resource block.

Aspect 42: The method of Aspect 40, wherein the portion of the intended DL bandwidth comprises a sub-band.

Aspect 43: The method of any of Aspects 15-42, wherein the measurement report indicates a maximum frequency overlap bandwidth associated with partial frequency overlapping or a minimum guard bandwidth between the DL frequency resource and the UL frequency resource based at least in part on a bandwidth criterion.

Aspect 44: The method of Aspect 43, further comprising receiving, from the base station, a configuration of the bandwidth criterion, wherein the bandwidth criterion comprises a cross beam interference threshold.

Aspect 45: The method of any of Aspects 15-44, wherein the measurement report is transmitted to the base station based at least in part on a determination that a trigger event has occurred.

Aspect 46: The method of any of Aspects 15-45, further comprising receiving, from the base station, an allocation of a feedback channel reserved for the measurement report, wherein the measurement report is transmitted using the feedback channel.

Aspect 47: A method of wireless communication performed by a base station, comprising: transmitting, to a user equipment (UE), in a full duplex communication mode, a configuration of a self-interference measurement (SIM) procedure associated with a receive (Rx) beam and a transmit (Tx) beam of the UE, wherein the SIM procedure is associated with an uplink (UL) frequency resource associated with a corresponding downlink (DL) frequency resource, wherein the SIM procedure corresponds to at least one of: a frequency overlap metric that indicates: an overlap between the DL frequency resource and the UL frequency resource, or a guard bandwidth between the DL frequency resource and the UL frequency resource, a time alignment between the DL frequency resource and the UL frequency resource, or a combination thereof; and receiving, from the UE, a measurement report based at least in part on the SIM procedure.

Aspect 48: The method of Aspect 47, wherein the SIM procedure is based at least in part on at least one of: a sounding reference signal, a UL demodulation reference signal, a physical UL shared channel, a physical UL control channel, or a combination thereof.

Aspect 49: The method of either of Aspects 47 or 48, wherein the frequency overlap metric comprises an overlap percentage of a UL bandwidth associated with the UL frequency resource that is captured in an intended DL bandwidth associated with the DL frequency resource, wherein the DL frequency resource corresponds to a DL RS that is measured using the SIM procedure.

Aspect 50: The method of Aspect 49, wherein the UL bandwidth is associated with at least one of: a sounding RS, a UL demodulation RS, a physical UL shared channel, a physical UL control channel, or a combination thereof.

Aspect 51: The method of either of Aspects 49 or 50, wherein the DL RS comprises a channel state information RS.

Aspect 52: The method of any of Aspects 49-51, wherein the SIM procedure is based at least in part on at least one of: a layer 1 signal to interference plus noise ratio, a reference signal received power, or a combination thereof.

Aspect 53: The method of any of Aspects 47-52, wherein the DL frequency resource partially overlaps the UL frequency resource, and wherein the frequency overlap metric indicates an overlap percentage that indicates a ratio of overlap of a UL bandwidth associated with the UL frequency resource to an intended DL bandwidth associated with the DL frequency resource.

Aspect 54: The method of Aspect 53, wherein the frequency overlap comprises a full frequency overlap, and wherein the frequency overlap metric indicates a one hundred percent overlap.

Aspect 55: The method of any of Aspects 47-52, wherein the DL frequency resource does not overlap the UL frequency resource, and wherein the frequency overlap metric indicates a guard bandwidth between the DL frequency resource and the UL frequency resource.

Aspect 56: The method of Aspect 55, wherein the frequency overlap comprises a non frequency overlap, and wherein the frequency overlap metric indicates a zero percent overlap.

Aspect 57: The method of any of Aspects 47-56, wherein the frequency overlap metric indicates an overlap percentage that is greater than or equal to zero percent and less than or equal to one hundred percent.

Aspect 58: The method of any of Aspects 47-57, further comprising: transmitting, to the UE, an indication of a selected frequency relationship between a UL bandwidth and an intended DL bandwidth, wherein the selected frequency relationship is based at least in part on the measurement report.

Aspect 59: The method of Aspect 58, wherein the selected frequency relationship corresponds to the frequency overlap metric based at least in part on a determination that a cross beam interference satisfies a threshold with a full frequency overlap SIM.

Aspect 60: The method of any of Aspects 47-59, wherein the measurement report is based at least in part on an additional SIM procedure associated with the Rx beam and the Tx beam, wherein, based at least in part on a determination of a cross beam interference associated with the SIM procedure, the additional SIM procedure corresponds to: an additional frequency overlap metric between the DL frequency resource and the UL frequency resource, that indicates: an additional overlap between the DL frequency resource and the UL frequency resource, or an additional guard bandwidth between the DL frequency resource and the UL frequency resource, an additional time alignment between the DL frequency resource and the UL frequency resource, or a combination thereof.

Aspect 61: The method of Aspect 60, wherein the measurement report is based at least in part on the additional SIM procedure.

Aspect 62: The method of either of Aspects 60 or 61, wherein the additional frequency overlap metric is not equal to the frequency overlap metric based at least in part on a determination that the cross beam interference satisfies a threshold.

Aspect 63: The method of Aspect 62, wherein the frequency overlap metric indicates a greater frequency overlap or a smaller guard bandwidth than a frequency overlap or a guard bandwidth indicated by the additional frequency overlap metric.

Aspect 64: The method of any of Aspects 60-63, wherein the additional time alignment is not the same as the time alignment based at least in part on a determination that the cross beam interference satisfies a threshold.

Aspect 65: The method of any of Aspects 47-64, wherein the measurement report indicates: a reference signal received power (RSRP) measurement or a signal to interference plus noise ratio (SINR) measurement, wherein the RSRP measurement or the SINR measurement is not associated with a SIM procedure; and a leaked received signal strength indicator (RSSI) or an additional RSRP associated with an additional SIM procedure.

Aspect 66: The method of Aspect 65, further comprising: transmitting an allocation of a channel measurement resource (CMR) associated with the Rx beam; transmitting an allocation of an interference measurement resource (IMR) associated with the Tx beam and the Rx beam; receiving a result of the RSRP measurement associated with the Rx beam based at least in part on the CMR; and receiving a result of a measurement, based at least in part on the IMR, of at least one of: the RSRP measurement associated with the Rx beam, an RSSI measurement associated with the Rx beam, or a combination thereof.

Aspect 67: The method of any of Aspects 47-66, wherein the measurement report indicates a signal to interference plus noise ratio (SINR) associated with the SIM.

Aspect 68: The method of Aspect 67, wherein the SINR is determined based at least in part on a ratio of a channel measurement result associated with a channel measurement resource to a SIM procedure result associated with an interference measurement resource.

Aspect 69: The method of any of Aspects 47-68, wherein the measurement report indicates a quantized reference signal received power (RSRP) measurement result or a quantized signal to interference plus noise ratio (SINK) measurement result.

Aspect 70: The method of Aspect 69, wherein the quantized RSRP measurement result or the quantized SINR measurement result indicates a level of a plurality of levels comprising a low level, a medium level, and a high level.

Aspect 71: The method of any of Aspects 47-70, wherein the measurement report indicates an average result over an entire intended DL bandwidth.

Aspect 72: The method of any of Aspects 47-71, wherein the measurement report indicates a result that corresponds to a portion of an intended DL bandwidth.

Aspect 73: The method of Aspect 72, wherein the portion of the intended DL bandwidth comprises a resource block.

Aspect 74: The method of Aspect 72, wherein the portion of the intended DL bandwidth comprises a sub-band.

Aspect 75: The method of any of Aspects 47-74, wherein the measurement report indicates a maximum frequency overlap bandwidth associated with partial frequency overlapping or a minimum guard bandwidth between the DL frequency resource and the UL frequency resource based at least in part on a bandwidth criterion.

Aspect 76: The method of Aspect 75, further comprising transmitting, to the UE, a configuration of the bandwidth criterion, wherein the bandwidth criterion comprises a cross beam interference threshold.

Aspect 77: The method of any of Aspects 47-76, wherein the measurement report is transmitted to the base station based at least in part on a determination that a trigger event has occurred.

Aspect 78: The method of any of Aspects 47-77, further comprising transmitting, to the UE, an allocation of a feedback channel reserved for the measurement report, wherein the measurement report is transmitted using the feedback channel.

Aspect 79: An apparatus for wireless communication at a device, comprising a processor; memory coupled with the processor; and instructions stored in the memory and executable by the processor to cause the apparatus to perform the method of one or more of Aspects 1-7.

Aspect 80: A device for wireless communication, comprising a memory and one or more processors coupled to the memory, the one or more processors configured to perform the method of one or more of Aspects 1-7.

Aspect 81: An apparatus for wireless communication, comprising at least one means for performing the method of one or more of Aspects 1-7.

Aspect 82: A non-transitory computer-readable medium storing code for wireless communication, the code comprising instructions executable by a processor to perform the method of one or more of Aspects 1-7.

Aspect 83: A non-transitory computer-readable medium storing a set of instructions for wireless communication, the set of instructions comprising one or more instructions that, when executed by one or more processors of a device, cause the device to perform the method of one or more of Aspects 1-7.

Aspect 84: An apparatus for wireless communication at a device, comprising a processor; memory coupled with the processor; and instructions stored in the memory and executable by the processor to cause the apparatus to perform the method of one or more of Aspects 8-14.

Aspect 85: A device for wireless communication, comprising a memory and one or more processors coupled to the memory, the one or more processors configured to perform the method of one or more of Aspects 8-14.

Aspect 86: An apparatus for wireless communication, comprising at least one means for performing the method of one or more of Aspects 8-14.

Aspect 87: A non-transitory computer-readable medium storing code for wireless communication, the code comprising instructions executable by a processor to perform the method of one or more of Aspects 8-14.

Aspect 88: A non-transitory computer-readable medium storing a set of instructions for wireless communication, the set of instructions comprising one or more instructions that, when executed by one or more processors of a device, cause the device to perform the method of one or more of Aspects 8-14.

Aspect 89: An apparatus for wireless communication at a device, comprising a processor; memory coupled with the processor; and instructions stored in the memory and executable by the processor to cause the apparatus to perform the method of one or more of Aspects 15-46.

Aspect 90: A device for wireless communication, comprising a memory and one or more processors coupled to the memory, the one or more processors configured to perform the method of one or more of Aspects 15-46.

Aspect 91: An apparatus for wireless communication, comprising at least one means for performing the method of one or more of Aspects 15-46.

Aspect 92: A non-transitory computer-readable medium storing code for wireless communication, the code comprising instructions executable by a processor to perform the method of one or more of Aspects 15-46.

Aspect 93: A non-transitory computer-readable medium storing a set of instructions for wireless communication, the set of instructions comprising one or more instructions that, when executed by one or more processors of a device, cause the device to perform the method of one or more of Aspects 15-46.

Aspect 94: An apparatus for wireless communication at a device, comprising a processor; memory coupled with the processor; and instructions stored in the memory and executable by the processor to cause the apparatus to perform the method of one or more of Aspects 47-78.

Aspect 95: A device for wireless communication, comprising a memory and one or more processors coupled to the memory, the one or more processors configured to perform the method of one or more of Aspects 47-78.

Aspect 96: An apparatus for wireless communication, comprising at least one means for performing the method of one or more of Aspects 47-78.

Aspect 97: A non-transitory computer-readable medium storing code for wireless communication, the code comprising instructions executable by a processor to perform the method of one or more of Aspects 47-78.

Aspect 98: A non-transitory computer-readable medium storing a set of instructions for wireless communication, the set of instructions comprising one or more instructions that, when executed by one or more processors of a device, cause the device to perform the method of one or more of Aspects 47-78.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A UE for wireless communication, comprising:
a memory; and
one or more processors, coupled to the memory, configured to cause the UE to:
perform, in a full duplex communication mode, a self-interference measurement (SIM) procedure associated with a receive (Rx) beam and a transmit (Tx) beam of the UE, wherein the SIM procedure is performed using an uplink (UL) frequency resource associated with a corresponding downlink (DL) frequency resource, wherein the SIM procedure is performed according to a frequency overlap metric that indicates:
an overlap between the DL frequency resource and the UL frequency resource, or
a guard bandwidth between the DL frequency resource and the UL frequency resource;
and
transmit, to a base station, a measurement report based at least in part on the SIM procedure.

2. The UE of claim 1, wherein the SIM procedure is based at least in part on at least one of:
 a sounding reference signal,
 a UL demodulation reference signal,
 a physical UL shared channel,
 a physical UL control channel, or
 a combination thereof.

3. The UE of claim 1, wherein the frequency overlap metric comprises an overlap percentage of a UL bandwidth associated with the UL frequency resource that is captured in an intended DL bandwidth associated with the DL frequency resource, wherein the DL frequency resource corresponds to a DL reference signal (RS) that is measured using the SIM procedure.

4. The UE of claim 3, wherein the DL RS comprises a channel state information RS.

5. The UE of claim 3, wherein the SIM procedure is based at least in part on at least one of:
 a layer 1 signal to interference plus noise ratio,
 a reference signal received power, or
 a combination thereof.

6. The UE of claim 1, wherein the DL frequency resource partially overlaps the UL frequency resource, and wherein the frequency overlap metric indicates an overlap percentage that indicates a ratio of overlap of a UL bandwidth associated with the UL frequency resource to an intended DL bandwidth associated with the DL frequency resource.

7. The UE of claim 6, wherein the frequency overlap comprises a full frequency overlap, and wherein the frequency overlap metric indicates a one hundred percent overlap.

8. The UE of claim 1, wherein the DL frequency resource does not overlap with the UL frequency resource, and wherein the frequency overlap metric indicates a guard bandwidth between the DL frequency resource and the UL frequency resource.

9. The UE of claim 1, wherein the frequency overlap comprises a non frequency overlap, and wherein the frequency overlap metric indicates a zero percent overlap.

10. The UE of claim 1, wherein the one or more processors are further configured to cause the UE to:
 receive, from the base station, an indication of a selected frequency relationship between a UL bandwidth and an intended DL bandwidth, wherein the selected frequency relationship is based at least in part on the measurement report.

11. The UE of claim 10, wherein the selected frequency relationship corresponds to the frequency overlap metric based at least in part on a determination that a cross beam interference satisfies a threshold with a full frequency overlap SIM.

12. The UE of claim 1, wherein the one or more processors are further configured to cause the UE to:
 perform an additional SIM procedure associated with the Rx beam and the Tx beam, wherein, based at least in part on a determination of a cross beam interference associated with the SIM procedure, the additional SIM procedure is performed according to an additional frequency overlap metric between the DL frequency resource and the UL frequency resource, that indicates:
  an additional overlap between the DL frequency resource and the UL frequency resource, or
  an additional guard bandwidth between the DL frequency resource and the UL frequency resource;
 and
 wherein the measurement report is based at least in part on the additional SIM procedure.

13. The UE of claim 12, wherein the additional frequency overlap metric is not equal to the frequency overlap metric based at least in part on a determination that the cross beam interference satisfies a threshold.

14. The UE of claim 13, wherein the frequency overlap metric indicates a greater frequency overlap or a smaller guard bandwidth than a frequency overlap or a guard bandwidth indicated by the additional frequency overlap metric.

15. The UE of claim 13, wherein an additional time alignment associated with the additional SIM procedure is not the same as a time alignment associated with the SIM procedure based at least in part on a determination that the cross beam interference satisfies a threshold.

16. The UE of claim 1, wherein the measurement report indicates:
 a reference signal received power (RSRP) measurement or a signal to interference plus noise ratio (SINR) measurement, wherein the RSRP measurement or the SINR measurement is not associated with a SIM procedure; and
 a leaked received signal strength indicator (RSSI) or an additional RSRP associated with an additional SIM procedure.

17. The UE of claim 16, wherein the one or more processors are further configured to cause the UE to:
 receive an allocation of a channel measurement resource (CMR) associated with the Rx beam;
 receive an allocation of an interference measurement resource (IMR) associated with the Tx beam and the Rx beam;
 perform the RSRP measurement associated with the Rx beam based at least in part on the CMR; and
 measure, based at least in part on the IMR, at least one of:
  the RSRP measurement associated with the Rx beam,
  an RSSI measurement associated with the Rx beam, or
  a combination thereof.

18. The UE of claim 1, wherein the measurement report indicates a signal to interference plus noise ratio (SINR) associated with the SIM procedure, wherein the SINR is determined based at least in part on a ratio of a channel measurement result associated with a channel measurement resource to a SIM procedure result associated with an interference measurement resource.

19. The UE of claim 1, wherein the measurement report indicates a quantized reference signal received power (RSRP) measurement result or a quantized signal to interference plus noise ratio (SINR) measurement result, wherein the quantized RSRP measurement result or the quantized SINR measurement result indicates a level of a plurality of levels comprising a low level, a medium level, and a high level.

20. The UE of claim 1, wherein the measurement report indicates at least one of an average result over an entire intended DL bandwidth or a result that corresponds to a portion of an intended DL bandwidth.

21. The UE of claim 1, wherein the measurement report indicates a maximum frequency overlap bandwidth associated with partial frequency overlapping or a minimum guard bandwidth between the DL frequency resource and the UL frequency resource based at least in part on a bandwidth criterion.

22. The UE of claim 21, wherein the one or more processors are further configured to cause the UE to receive, from the base station, a configuration of the bandwidth criterion, wherein the bandwidth criterion comprises a cross beam interference threshold.

23. A method of wireless communication performed by a user equipment (UE), comprising:

performing, in a full duplex communication mode, a self-interference measurement (SIM) procedure associated with a receive (Rx) beam and a transmit (Tx) beam of the UE, wherein the SIM procedure is performed using an uplink (UL) frequency resource associated with a corresponding downlink (DL) frequency resource, wherein the SIM procedure is performed according to a frequency overlap metric that indicates:
an overlap between the DL frequency resource and the UL frequency resource, or
a guard bandwidth between the DL frequency resource and the UL frequency resource;
and transmitting, to a base station, a measurement report based at least in part on the SIM procedure.

* * * * *